(12) United States Patent
Mach Shepherd et al.

(10) Patent No.: US 10,013,803 B2
(45) Date of Patent: Jul. 3, 2018

(54) SYSTEM AND METHOD OF 3D MODELING AND VIRTUAL FITTING OF 3D OBJECTS

(71) Applicant: FITFULLY LTD., Tel Aviv (IL)

(72) Inventors: Batia Mach Shepherd, Ramat Hasharon (IL); Yirmeyahu Kaminski, Jerusalem (IL); Gadi Naor, Tel Aviv (IL); Roy Tertman, Tel Aviv (IL)

(73) Assignee: FITFULLY LTD., Tel Aviv (IL)

( * ) Notice: Subject to any disclaimer, the term of this patent is extended or adjusted under 35 U.S.C. 154(b) by 0 days.

(21) Appl. No.: 15/515,876

(22) PCT Filed: Oct. 6, 2015

(86) PCT No.: PCT/IL2015/050994
§ 371 (c)(1),
(2) Date: Mar. 30, 2017

(87) PCT Pub. No.: WO2016/051416
PCT Pub. Date: Apr. 7, 2016

(65) Prior Publication Data
US 2017/0249783 A1    Aug. 31, 2017

Related U.S. Application Data

(60) Provisional application No. 62/057,390, filed on Sep. 30, 2014.

(51) Int. Cl.
*G06T 19/20* (2011.01)
*G06T 17/20* (2006.01)

(52) U.S. Cl.
CPC .............. *G06T 17/20* (2013.01); *G06T 19/20* (2013.01); *G06T 2210/56* (2013.01)

(58) Field of Classification Search
CPC ........................ G06T 19/00; G06T 2219/2004
See application file for complete search history.

(56) References Cited

U.S. PATENT DOCUMENTS 5,123,169 A   6/1992   White et al.
5,128,880 A   7/1992   White
(Continued)

OTHER PUBLICATIONS

Sander, J., & Beyerer, J. (Oct. 2013). "Bayesian fusion: modeling and application. In Sensor Data Fusion: Trends, Solutions", Applications (SDF), 2013 Workshop on (pp. 1-6). IEEE.
(Continued)

*Primary Examiner* — Phi Hoang
(74) *Attorney, Agent, or Firm* — Browdy and Neimark, PLLC

(57) ABSTRACT

Method and system of virtual fitting a foot with a shoe by obtaining a first and second 3D model associated with the surface of the foot and interior cavity of the shoe, respectively, each 3D model comprising a point cloud; aligning the point clouds such that the heel extreme point of the two point clouds align and the ankle back extreme point of the first point cloud aligns with the top back point of the second point cloud; calculating for at least one point p in the first point cloud a value of at least one fit indicator determined based on a distance between p and a corresponding point q in the aligned second point cloud; and outputting, to a display device, a graphical representation of the first 3D model colored in accordance with the fit calculated at p.

18 Claims, 14 Drawing Sheets

(56) References Cited

U.S. PATENT DOCUMENTS

| | | |
|---|---|---|
| 5,195,030 A | 3/1993 | White |
| 5,206,804 A | 4/1993 | Thies et al. |
| 5,216,594 A | 6/1993 | White et al. |
| 5,231,723 A | 8/1993 | White et al. |
| 5,237,520 A | 8/1993 | White |
| 5,339,252 A | 8/1994 | White et al. |
| 5,477,371 A | 12/1995 | Shafir |
| 5,714,098 A | 2/1998 | Potter |
| 5,879,725 A | 3/1999 | Potter |
| 6,549,639 B1 | 4/2003 | Genest |
| 6,711,293 B1 | 3/2004 | Lowe |
| 6,735,547 B1 | 5/2004 | Yfantis |
| 6,741,728 B1 | 5/2004 | Genest |
| 6,847,915 B2 | 1/2005 | Liang et al. |
| 6,975,232 B1 | 12/2005 | McKenna |
| 7,051,452 B2 | 5/2006 | Brooks |
| 7,089,152 B2 | 8/2006 | Oda et al. |
| 7,343,691 B2 | 3/2008 | Long et al. |
| 7,356,425 B2 | 4/2008 | Krahnstoever et al. |
| 7,433,502 B2 | 10/2008 | Rutschmann |
| 7,536,794 B2 | 5/2009 | Hay et al. |
| 7,557,966 B2 | 7/2009 | Pishdadian et al. |
| 7,656,402 B2 | 2/2010 | Abraham et al. |
| 7,676,936 B2 | 3/2010 | Ball et al. |
| 7,706,028 B2 | 4/2010 | Pishdadian et al. |
| 7,738,145 B2 | 6/2010 | Pishdadian et al. |
| 7,742,633 B2 | 6/2010 | Huang |
| 7,876,326 B2 | 1/2011 | Russ |
| 8,005,558 B2 | 8/2011 | Waatti |
| 8,165,401 B2 | 4/2012 | Funayama et al. |
| 8,406,454 B2 | 3/2013 | Bar |
| 2006/0012597 A1* | 1/2006 | Chakraborty ..... G06F 17/30259 345/419 |
| 2006/0104503 A1 | 5/2006 | Huang et al. |
| 2009/0051683 A1* | 2/2009 | Goonetilleke ......... A43D 1/025 345/419 |
| 2010/0111370 A1* | 5/2010 | Black ................. G06K 9/00369 382/111 |
| 2010/0238271 A1* | 9/2010 | Pfeiffer .................... A43D 1/06 348/46 |
| 2011/0055053 A1 | 3/2011 | Rutschmann |
| 2014/0164169 A1* | 6/2014 | Rusu ................. G06Q 30/0621 705/26.5 |
| 2014/0180866 A1* | 6/2014 | Gonzales ................. A43D 3/04 705/26.7 |
| 2014/0277683 A1* | 9/2014 | Gupta .................... G06F 17/50 700/132 |
| 2017/0053335 A1* | 2/2017 | Hanscom ............... A43D 1/025 |

OTHER PUBLICATIONS

Slesareva, N., Bruhn, A., & Weickert, J., "Optic flow goes stereo: A variational method for estimating discontinuity-preserving dense disparity maps", Pattern Recognition, 33-40. (2005).

Goldluecke, B., & Magnor, M. (2004). "Weighted minimal hypersurfaces and their applications in computer vision", Computer Vision-ECCV 2004, 366-378.

Furukawa, Y., & Ponce, J. (2010). "Accurate, dense, and robust multiview stereopsis. IEEE transactions on pattern analysis and machine intelligence", 32(8), 1362-1376.

* cited by examiner

Fig. 1
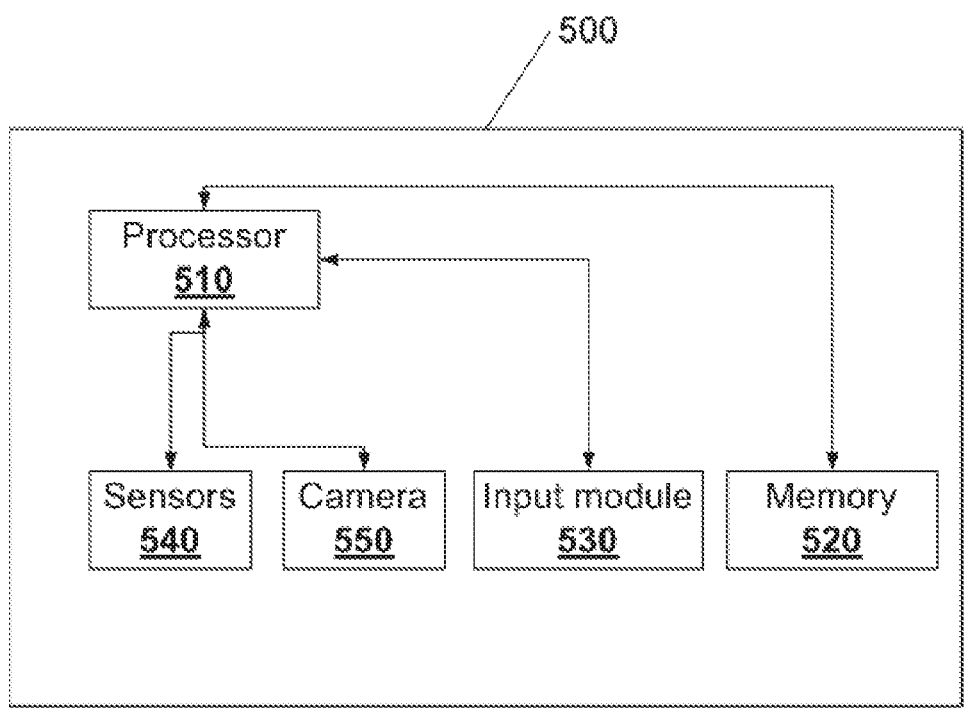
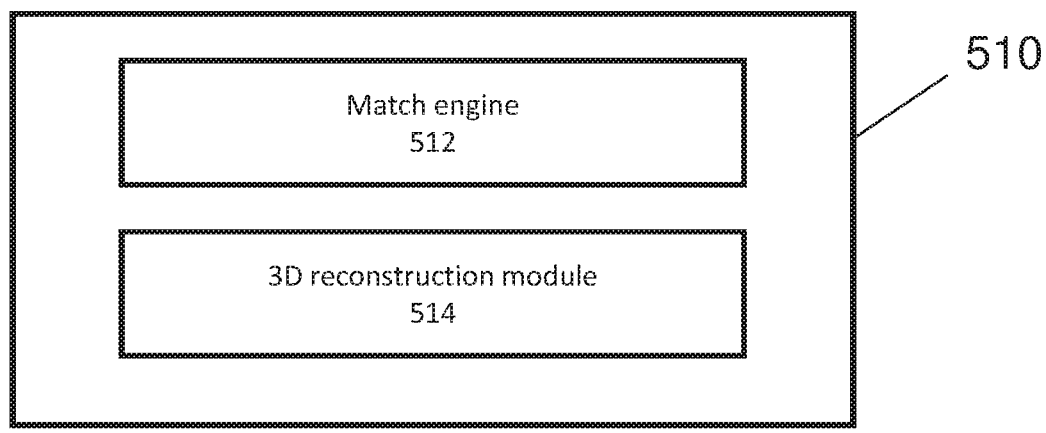

Fig. 4
B = BLUE
G = GREEN
R = RED
Y = YELLOW
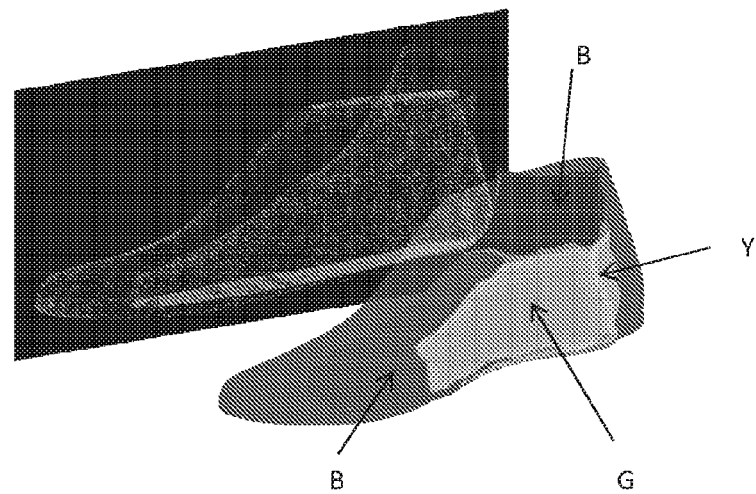
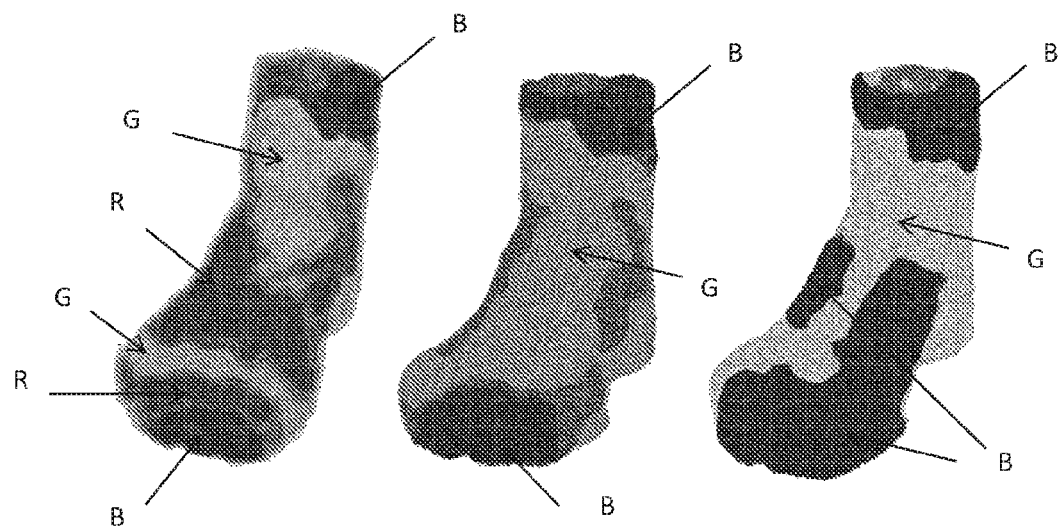

Fig. 12
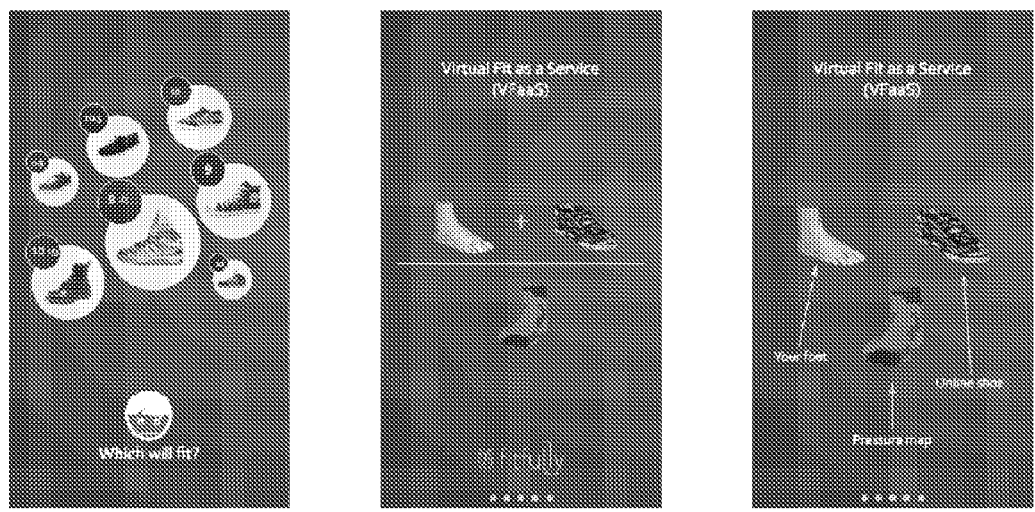
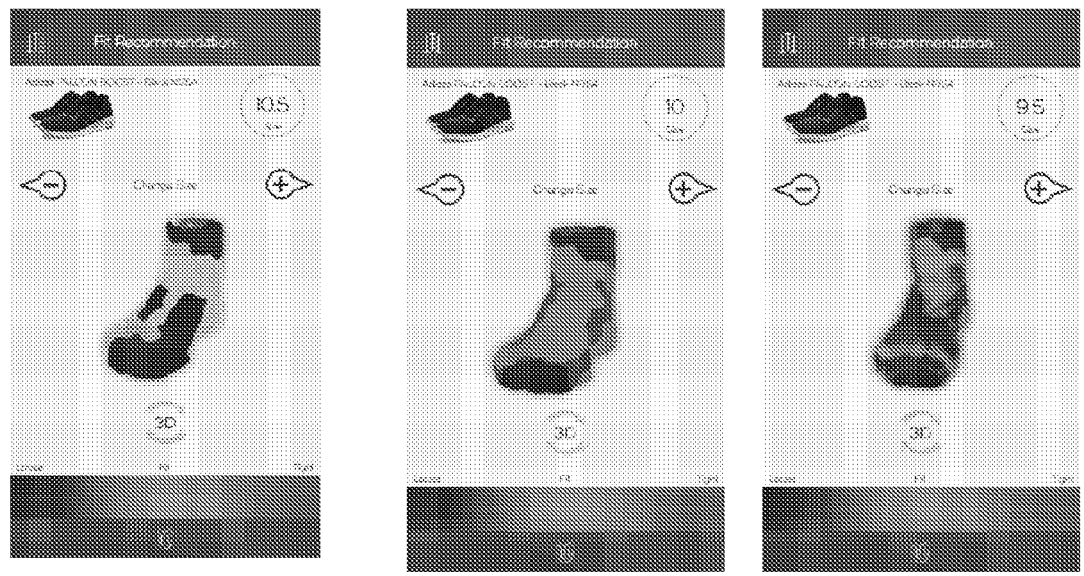

SYSTEM AND METHOD OF 3D MODELING AND VIRTUAL FITTING OF 3D OBJECTS

TECHNICAL FIELD

The presently disclosed subject matter relates generally to 3D modeling, and in particular, to 3D reconstruction based on 2D images and virtual fitting of 3D objects.

BACKGROUND 3D modeling, the process of generating a mathematical representation of a three-dimensional (3D) surface of an object, is an important part of computer vision and applications thereof 3D modeling can be used in various industries like gaming, interior designing, architecture, medicine, etc. Generation of 3D shapes of objects such as bodies and body parts is also an important stage of a virtual fitting, i.e. a process of analyzing a fit between two objects without the objects physically coming into contact with each other. Virtual fitting is useful for the production and selection of products whose shape needs to be adapted to the shape of the bodies or body parts (e.g. shoes, footbeds or arch supports, prostheses, articles of clothing, etc.), such as a body part and an article to be worn on the body.

By way of non-limiting example, virtual fitting of items to purchase is very important for Internet shoe retailing. It is estimated that Internet shoe sales in the U.S. alone generate revenue of over $10 billion annually for retailers. Despite that, Internet shoe retailers suffer from a high volume of returns due to poor fit, since the consumer has no opportunity to try on the shoes prior to placing the order.

Problems of 3D modeling and virtual fitting have been recognized in the conventional art. Various solutions have been proposed. For example:

U.S. Pat. No. 6,975,232 discloses taking a thermal infrared image of a shoe on a foot, taking a thermal infrared image of a shoe having no foot inside, taking a thermal infrared image of a foot not in a shoe, and comparing the images to determine a fit of foot inside the shoe.

U.S. Pat. No. 7,433,502 discloses wrapping a body part with an elastic cover having high contrast marks which are photogrammetrically analyzable, taking overlapping images of the body part from different shooting positions, and processing the images to determine the space coordinates of the photographed body part.

U.S. Pat. No. 6,549,639 discloses placing an object such as a foot on a background pattern of regular repetitive marks, and recording a 2D image to determine where in the image the repetitive marks are interrupted by the object, thereby determining the edge of the object. Multiple 2D images from different perspectives are then used to create a 3D image of the object.

U.S. Pat. No. 7,742,633 discloses reconstructing a 3D model of a foot by having a user wear an elastic sock having specially coded multicolored stripes or spots, and stand on a transparent plane of a platform. Using at least six digital cameras, the contours of the sole and upper part of the foot are recorded and a 3D model is obtained.

U.S. Pat. No. 7,557,966 discloses a scanner comprising a plurality of cameras arranged in pairs and positioned around an object covered by a textured surface and illuminated by unstructured light. The images recorded by the plurality of cameras are stitched to form a point cloud useable for determining a shoe size or for making a customized shoe last.

U.S. Pat. No. 8,406,454 discloses an apparatus for obtaining an outline of a foot in order to select a best matching insole adapter, the apparatus comprising a platform on which both feet are placed, and an optical system which irradiates the feet with near-infrared light and captures an image of each foot and processes the images to identify inner and outer foot contours.

U.S. Pat. No. 6,847,915 discloses a sole measuring device for producing 3D renditions of the bottom of a foot, the device comprising a plurality of linear displacement sensors which measure the displacement caused by the bottom surface of a foot when placed on top of the sensors. A data processor compiles a three dimensional rendition of the bottom of the foot surface from individual data points from the displacement sensors.

GENERAL DESCRIPTION

In accordance with certain aspects of the presently disclosed subject matter, there is provided a method of virtual fitting of a foot with a shoe, the method comprising, by a processor: obtaining data informative of a first 3D model associated with the foot, the first 3D model having a first point cloud comprising a plurality of data points representing the surface of the first 3D model; obtaining data informative of a second 3D model associated with an interior cavity of the shoe, the second 3D model having a second point cloud comprising a plurality of data points representing the surface of the second 3D model; aligning the first and second point clouds such that the heel extreme point of the second point cloud aligns with the heel extreme point of the first point cloud and the ankle back extreme point of the first point cloud aligns with the top back point of the second point cloud; calculating for at least one point p in the first point cloud a value of at least one fit indicator indicative of a fit between the foot and the shoe at the point p, the value of fit indicator determined based on a distance between the at least one point p and a corresponding point q in the aligned second point cloud; and outputting, to a display device, a graphical representation of the first 3D model colored in accordance with the calculated at least one fit indicator, wherein the color at p is indicative of the fit calculated at p.

In accordance with certain other aspects of the presently disclosed subject matter, there is provided a system for virtual fitting of a foot with a shoe, comprising: a memory configured to store data informative of first 3D model associated with the foot, the first 3D model having a first point cloud comprising a plurality of data points representing the surface of the first 3D model, and to store data informative of a second 3D model associated with an interior cavity of the shoe, the second 3D model having a second point cloud comprising a plurality of data points representing the surface of the second 3D model; and a processor operatively coupled to the memory and configured to process the first and second point clouds by: aligning the first and second point clouds such that the heel extreme point of the second point cloud aligns with the heel extreme point of the first point cloud and the ankle back extreme point of the first point cloud aligns with the top back point of the second point cloud; calculating for at least one point p in the first point cloud a value of at least one fit indicator indicative of a fit between the foot and the shoe at the point p, the value of the at least one fit indicator determined based on a distance between the at least one point p and a corresponding point q in the aligned second point cloud; and outputting, to a display device, a graphical representation of the first 3D model colored in accordance with the calculated at least one fit indicator, wherein the color at p is indicative of the fit calculated at p.

In accordance with certain other aspects of the presently disclosed subject matter, there is provided a computer program product implemented on a non-transitory computer usable medium having computer readable program code embodied therein to cause the computer to perform a method of virtual fitting of a foot with a shoe, the method comprising: obtaining data informative of a first 3D model associated with the foot, the first 3D model having a first point cloud comprising a plurality of data points representing the surface of the first 3D model; obtaining data informative of a second 3D model associated with an interior cavity of the shoe, the second 3D model having a second point cloud comprising a plurality of data points representing the surface of the second 3D model; aligning the first and second point clouds such that the heel extreme point of the second point cloud aligns with the heel extreme point of the first point cloud and the ankle back extreme point of the first point cloud aligns with the top back point of the second point cloud; calculating for at least one point p in the first point cloud a value of at least one fit indicator indicative of a fit between the foot and the shoe at the point p, the value of the at least one fit indicator determined based on a distance between the at least one point p and a corresponding point q in the aligned second point cloud; and outputting, to a display device, a graphical representation of the first 3D model colored in accordance with the calculated at least one fit indicator, wherein the color at p is indicative of the fit calculated at p.

In accordance with further aspects and, optionally, in combination with other aspects of the presently disclosed subject matter, the second 3D model can be associated with a shoe last of the shoe representative of the interior cavity of the shoe. The data informative of the 3D model associated with the foot can be obtained by generating a 3D reconstruction of the foot.

In accordance with further aspects and, optionally, in combination with other aspects of the presently disclosed subject matter, aligning the first and second point clouds can comprise calculating a Principal Component Analysis (PCA) of each point cloud, aligning the centers and the axes of each point cloud, detecting the plane of each point cloud, calculating the residual rigid transformation to make the two planes coincide, and refining the results of the transformation to make the heel extreme point of the second point cloud align with the heel extreme point of the first point cloud and the ankle back extreme point of the first point cloud align with the top back point of the second point cloud. Aligning the centers and the axes of each point cloud can comprise finding the optimal rigid transformation that merges the local coordinate systems of each point cloud. Detecting the plane of the second point cloud can comprise detecting points of low curvature and applying a statistical technique to the detected points to identify the points that form the most planar pattern. Refining the results of the transformation can further comprise detecting the heel extreme point as the point of local maximal curvature in the region of the heel bottom, and detecting the ankle back extreme point as lying beneath the malleoli.

In accordance with further aspects and, optionally, in combination with other aspects of the presently disclosed subject matter, aligning the first and second point clouds can further comprise applying an articulated motion to the toe region of the first point cloud at an articulation axis detected as the front point where the interior arc of the foot is tangent to the ground and/or simulating an articulated motion of the ankle with respect to the foot.

In accordance with further aspects and, optionally, in combination with other aspects of the presently disclosed subject matter, calculating the value for the at least one fit indicator can comprise calculating the normal $n_p$ of the first point cloud surface at p, considering the line $l_p$ passing through p and parallel to the normal $n_p$, calculating the intersection point q between the line $l_p$ and the second point cloud, and calculating the distance between p and q, the distance being indicative of a fit indicator. The at least one fit indicator can be calculated at each of a plurality of different regions of the first point cloud, each region comprising at least two points, and each region can be colored according to the at least one fit indicator calculated for the given region.

In accordance with further aspects and, optionally, in combination with other aspects of the presently disclosed subject matter, the processor can provide a recommendation in accordance with the at least one fit indicator. Providing a recommendation can include at least one of recommending if the shoe is a good fit, recommending a different shoe to try, and recommending a different size to try.

In accordance with certain other aspects of the presently disclosed subject matter there is provided a method of generating a 3D reconstruction of an object, the method comprising, by a processor: obtaining a first image depicting a substantially planar surface; obtaining a sequence of second images, each second image depicting a scanning area from a different camera angle, the scanning area comprising the planar surface having been placed thereon: the object, and a substantially planar reference object having known dimensions; calculating homographies between each consecutive second image in the sequence of second images; detecting the reference object in a plurality of second images, the detection being based in part on differences between the first image depicting the planar surface without the reference object and the plurality of second images depicting the planar surface with the reference object; calibrating camera parameters associated with the sequence of second images, the calibrating being based in part on a combination of the calculated homographies and parameters of the detected reference object in the plurality of second images; calculating a pair-wise dense 3D reconstruction of the object and planar surface from the sequence of second images in accordance with the calibrated camera parameters; applying an overall surface refinement process to the 3D reconstruction; and segmenting the 3D reconstructed object from the 3D reconstructed planar surface.

In accordance with certain other aspects of the presently disclosed subject matter, there is provided a system for generating a 3D reconstruction of an object, comprising a memory configured to store data informative of a first image depicting a substantially planar surface and a sequence of second images, each second image depicting a scanning area from a different camera angle, the scanning area comprising the planar surface having been placed thereon: the object, and a substantially planar reference object having known dimensions; and a processor operatively coupled to the memory and configured to: calculate homographies between each consecutive second image in the sequence of second images; detect the reference object in a plurality of second images, the detection being based in part on differences between the first image depicting the planar surface without the reference object and the plurality of second images depicting the planar surface with the reference object; calibrate camera parameters associated with the sequence of second images, the calibrating being based in part on a combination of the calculated homographies and parameters of the detected reference object in the plurality of second images; calculate a pair-wise dense 3D reconstruction of the object and planar surface from the sequence of second images in accordance with the calibrated camera parameters; apply an overall surface refinement process to the 3D reconstruction; and segment the 3D reconstructed object from the 3D reconstructed planar surface.

In accordance with certain other aspects of the presently disclosed subject matter, there is provided a computer program product implemented on a non-transitory computer usable medium having computer readable program code embodied therein to cause the computer to perform a method of generating a 3D reconstruction of an object, the method comprising: obtaining a first image depicting a substantially planar surface; obtaining a sequence of second images, each second image depicting a scanning area from a different camera angle, the scanning area comprising the planar surface having been placed thereon: the object, and a substantially planar reference object having known dimensions; calculating homographies between each consecutive second image in the sequence of second images; detecting the reference object in a plurality of second images, the detection being based in part on differences between the first image depicting the planar surface without the reference object and the plurality of second images depicting the planar surface with the reference object; calibrating camera parameters associated with the sequence of second images, the calibrating being based in part on a combination of the calculated homographies and parameters of the detected reference object in the plurality of second images; calculating a pair-wise dense 3D reconstruction of the object and planar surface from the sequence of second images in accordance with the calibrated camera parameters; applying an overall surface refinement process to the 3D reconstruction; and segmenting the 3D reconstructed object from the 3D reconstructed planar surface.

In accordance with further aspects and, optionally, in combination with other aspects of the presently disclosed subject matter, the 3D reconstruction of the object can be used in virtual fitting of the object with a second object or in 3D printing of the object.

In accordance with further aspects and, optionally, in combination with other aspects of the presently disclosed subject matter, detecting the reference object can comprise: aligning each second image with the first image; obtaining a plurality of third images associated with the plurality of second images, each third image associated with a given second image and indicative of a difference between the given second image and the first image after the aligning; applying an adaptive thresholding process to each third image thereby segmenting each third image; applying a morphological filtering process to each segmented third image to produce candidate blobs; segmenting candidate blobs located in the image interior; and identifying the segmented candidate blob that best matches a rectangle, under a perspective projection, as the reference object. Obtaining the plurality of third images can comprise comparing each second image to the first image by calculating a set of homographies $J_k$ between the first image and each image $I_k$ in the plurality of second images, using the homographies $J_k$ to align each second image $I_k$ with the first image thereby obtaining a plurality of aligned second images, applying a subtraction process to each aligned second image to produce a plurality of third images associated with the plurality of second images, whereby the reference image is subtracted from each aligned second image thereby yielding a third image.

In accordance with further aspects and, optionally, in combination with other aspects of the presently disclosed subject matter, calibrating can further comprise refining the parameter calibration by applying an optimal triangulation algorithm to data points matched as a result of the calculated homographies to reconstruct the data points in 3D, and minimizing the sum of square distances between the reconstructed data points and the 3D reference plane.

In accordance with further aspects and, optionally, in combination with other aspects of the presently disclosed subject matter, segmenting can comprise detecting a dominant plane in the 3D reconstruction, extracting data points not lying on the dominant plane, and clustering the extracted data points to isolate the data points lying on the surface of the 3D reconstruction of the object.

BRIEF DESCRIPTION OF THE DRAWINGS in order to better understand the subject matter that is disclosed herein and to exemplify how it may be carried out in practice, embodiments will now be described, by way of non-limiting example only, with reference to the accompanying drawings, in which:

FIG. 1 is a generalized functional diagram of a 3D Modeling and Virtual Fitting System, in accordance with certain embodiments of the presently disclosed subject matter;

FIG. 4 is a non-limiting example of a 3D foot model colored in accordance with calculated fit indicators, in accordance with certain embodiments of the presently disclosed subject matter;

FIG. 12 is a non-limiting example of screens of a smartphone app, in accordance with certain embodiments of the presently disclosed subject matter;

DETAILED DESCRIPTION OF EMBODIMENTS

Figure 2:
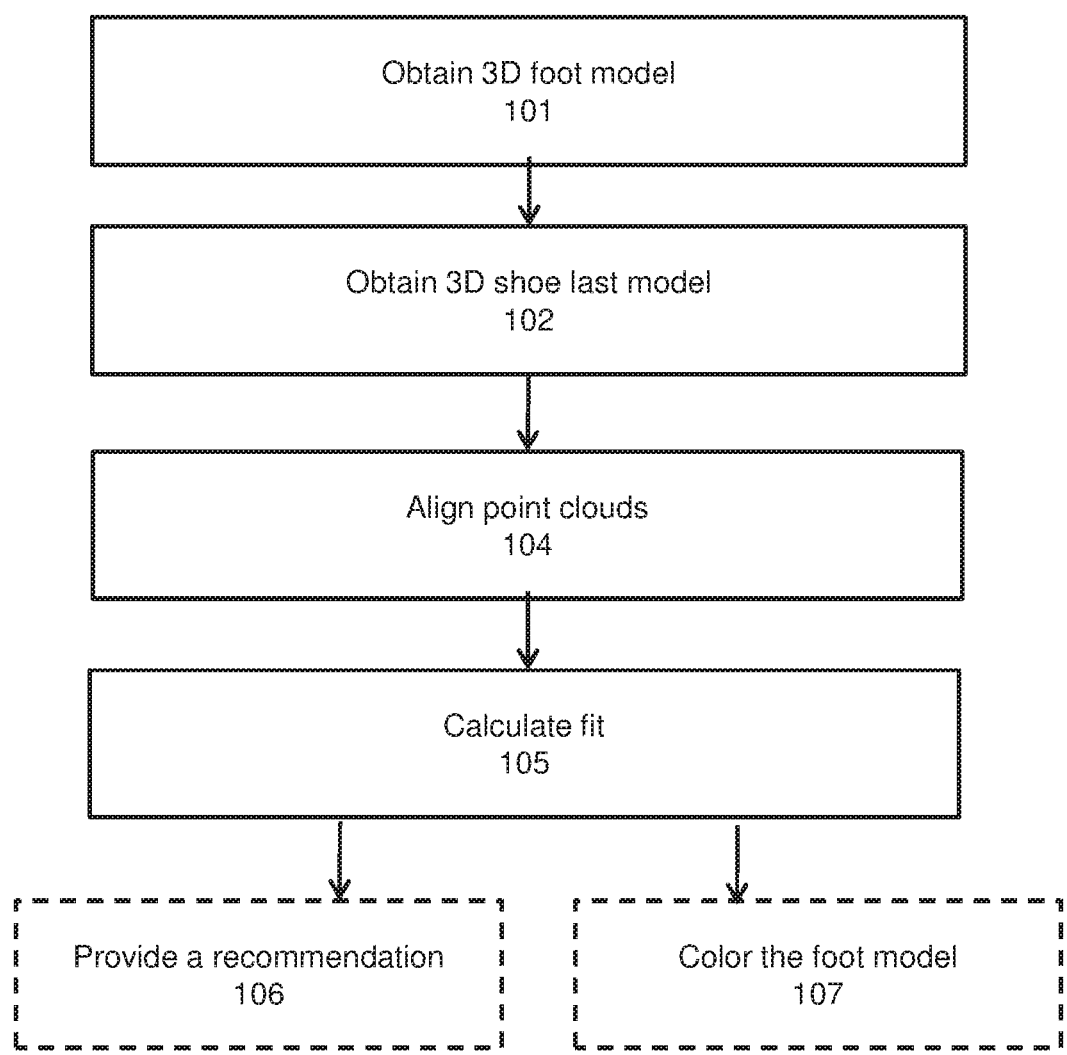
FIG. 2 is a generalized flow chart of virtual fitting, in accordance with certain embodiments of the presently disclosed subject matter.

The principles and operation of methods and systems for 3D modeling and/or virtual fitting according to the presently disclosed subject matter may be better understood with reference to the drawings and the accompanying description.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "aligning", "associating" "selecting," "detecting," "processing," "generating," "calculating," "determining," "obtaining" or the like, refer to the action(s) and/or process(es) of a computer that manipulate and/or transform data into other data, said data represented as physical, such as electronic, quantities and/or said data representing the physical objects.

The term "computer" should be expansively construed to cover any kind of electronic device with data processing capabilities including, by way of non-limiting example, a processor, or other suitable parts of the computer-based 3D modeling and virtual fitting system disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein can be performed by a computer specially constructed for the desired purposes or by a general-purpose computer specially configured for the desired purpose by a computer program stored in a computer readable storage medium.

The references cited in the background teach many principles of 3D modeling and virtual fitting that may be applicable to the presently disclosed subject matter. Therefore the full contents of these publications are incorporated by reference herein where appropriate for teachings of additional or alternative details, features and/or technical background.

Embodiments of the presently disclosed subject matter are not described with reference to any particular programming language. It will be appreciated that a variety of programming languages can be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "and other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

Bearing this in mind, attention is drawn to FIG. 1, where there is illustrated a generalized functional diagram of a 3D Modeling and Virtual Fitting System (MVFS) 500, MVFS 500 can include, in some embodiments, a processor 510 operatively coupled to each of a camera 550, an input module 530 and a memory 520. Optionally MVFS 500 can further include one or a plurality of sensors 540 operatively coupled to processor 510.

In some embodiments, processor 510 can be configured to store and/or run computer-readable instructions that, when executed by the processor, cause the processor to perform operations described herein. Processor 510 can include a plurality of processors. By way of non-limiting example, at least one processor 510 can be housed in a mobile computing device, and/or be in communication with a mobile computing device.

In some embodiments, memory 520 can be configured to store images, data informative of images and/or data associated with images (hereinafter collectively referred to as "images"), 3D models, program data, and/or executable program instructions. Memory 520 can include a plurality of memories.

In some embodiments, input module 530 can be configured to receive input, including user input and/or system input related to 3D reconstruction and virtual fitting. Input module 530 can include a plurality of input modules.

In some embodiments, camera 550 can be associated with (e.g., operatively connected to or comprised in, etc.) a mobile computing device, including for example a smartphone. Camera 550 can include a plurality of cameras. In some embodiments, camera 550 can be any image capture device for capturing digital 2D images. In some embodiments, camera 550 can be a still image camera, a video camera, or a combination thereof.

In some embodiments, sensors 540 can include one or more sensors useable to obtain data related to camera orientation, e.g., gyroscope, accelerometer, etc.

Processor 510 can be configured to execute several functional modules in accordance with computer-readable instructions implemented on a non-transitory computer usable medium. Such functional modules are referred to hereinafter as comprised (or included) in the processor. Processor 510 can include, in certain embodiments, such functional modules as a match engine 512, and a 3D reconstruction module 514, the modules configured as will be further detailed with reference to FIGS. 2, 8, and 10.

It is noted that the teachings of the presently disclosed subject matter are not bound by the specific MVFS described with reference to FIG. 1. Equivalent and/or modified functionality can be consolidated or divided in another manner and can be implemented in any appropriate combination of software, firmware and hardware. The processor can be implemented as a suitably programmed computer.

It is noted that MVFS can comprise 3D Reconstruction and Virtual Fitting sub-systems. Alternatively, 3D Reconstruction functions can be provided by a system independent from a system providing Virtual Fitting functions described herein. 3D reconstruction techniques in accordance with the currently disclosed subject matter can be used for purposes other than virtual fitting. Virtual fitting techniques in accordance with the currently disclosed subject matter can be used with 3D models other than obtained using the disclosed herein 3D reconstruction techniques and, optionally, obtained from an external system.

It should be noted that while, throughout the description that follows, reference is made to 3D reconstruction of a foot, such reference is made for illustrative purposes only. It should be appreciated that the teachings disclosed herein are applicable, unless the context suggests otherwise, to 3D reconstruction of any object which can be placed on a planar surface and imaged from different angles, including, e.g. other body parts as well as inanimate objects. Likewise, unless the context suggests otherwise, the teachings disclosed herein are applicable to virtual fitting of any objects which can be represented by 3D models comprising respective planar structures usable for aligning the models.

Referring now to FIG. 2, there is illustrated a generalized flow chart of virtual fitting, in accordance with certain embodiments of the currently presented subject matter. The system obtains (101) data informative of a 3D model associated with a foot ("3D foot model"), and obtains (102) data informative of a 3D model associated with an interior cavity of a shoe or a shoe last ("3D shoe last model"). The 3D foot model comprises data informative of a point cloud consisting of data points representing an external surface of the 3D foot model, and the 3D shoe last model comprises data informative of a point cloud consisting of data points representing an external surface of a 3D shoe last model. The 3D foot model and 3D shoe last model can be stored in memory 520.

A "point cloud" of an object, as used herein, should be expansively construed to cover any set of data points characterized by respective coordinates and representing the exterior surface of the object.

Figure 8:
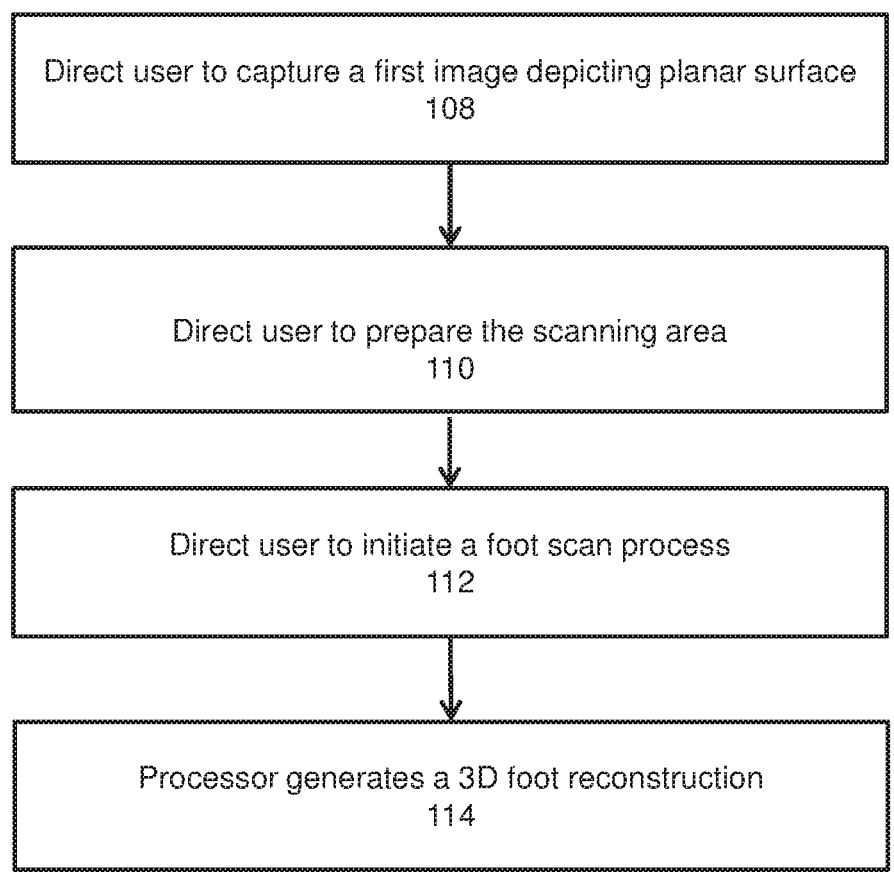
FIG. 8 is illustrated a generalized flow chart of generating a 3D foot reconstruction, in accordance with certain embodiments of the presently disclosed subject matter.

In some embodiments, obtaining a 3D foot model can include scanning a foot and generating a respective point cloud of the foot, as will be detailed below with reference to FIGS. 8-10. Obtaining a 3D foot model can further include storing the 3D foot model in a 3D foot model database, e.g. in memory 520. In some embodiments, a 3D foot model database can be stored locally, remotely and/or in a cloud type environment.

In some embodiments, obtaining a 3D shoe last model can include scanning and/or capturing images of the inside of a shoe or a shoe last. In some embodiments, the 3D shoe last model can be obtained by capturing image informative data (e.g. using a specific scanner arm or camera placed inside a shoe to capture shoe features and/or measurements from inside the shoe and/or by mapping key reference points inside the shoe) and further processing by the processor 510. In some embodiments, the 3D model of the inside of a shoe can be obtained by processing images of an actual shoe last, e.g. a shoe last created from a gel-plastic material.

Obtaining a 3D shoe last model can further include storing the 3D shoe last model in a 3D shoe last model database, e.g. in memory 520. In some embodiments, a 3D shoe last model database can be stored locally, remotely and/or in a cloud type environment.

The system then aligns (104) the point cloud of the 3D foot model and the point cloud of the 3D shoe last model (e.g. using match engine 512) such that the heel extreme point of the 3D shoe last model point cloud aligns with the heel extreme point of the 3D foot model point cloud and the ankle back extreme point of the 3D foot model point cloud aligns with the top back point of the 3D shoe last model point cloud.

In some embodiments, point cloud aligning 104 can include: (i) calculating the Principal Component Analysis (PCA) of each point cloud (i.e. the 3D foot model and 3D shoe last model), (ii) aligning the centers and the axes of each point cloud by finding the optimal rigid transformation that merges the two local coordinate systems of the models, (iii) detecting the plane of each point cloud (sole in the shoe last and sole of foot), (iv) calculating the residual rigid transformation to make the two planes coincide, and (v) refining the results of the transformation to make the two (i.e. the foot and the shoe last point clouds) heels' extreme point align, and the ankle back extreme point of the foot point cloud and the top back point of the shoe last to align with each other. The ankle back extreme point of the foot point cloud and the top back point of the shoe last can be said to "align" with each other even if they are not in perfect alignment but are in close proximity to one another (e.g. within a predetermined threshold Euclidean distance). The heel extreme point can be detected as the point of local maximal curvature in the region of the heel bottom, and the ankle back extreme point can be detected as lying at the bottom of, or just beneath, the malleoli, and the malleoli can be detected as the high-curved regions in the upper part of the foot reconstruction.

For some users, performing these alignments will require simulating an articulated motion of the ankle with respect to the foot, in order to simulate a straight (substantially vertical) ankle position, since due to the position of the foot and the leg during the scanning process, the reconstructed ankle may be bent. To carry out such an articulated motion, one can detect the central axis of the leg, by e.g. by segmenting a cylinder having a surface comprised entirely of leg data points (as opposed to foot data points), and using the central axis of the cylinder to represent the central axis of the leg. The set of leg points can be refined by keeping only points whose surface normal is orthogonal to the central axis of the leg. The articulated motion can then be performed by pivoting the central axis around its contact point with the foot plane, and pivoting the refined set of leg points in a correspondingly similar fashion to preserve the 3D relationship between each leg point and the central axis of the leg.

In some cases, the shoe-last sole cannot be represented by a plane. In order to overcome this problem, the points with low curvature (i.e. relatively straight) in the shoe-last can be detected first. These points cover the whole sole as well as other parts of the foot. Then, using a robust statistical technique, e.g. RANSAC, the points that form the most planar pattern can be detected. These points can then be used as representing the plane of the shoe point cloud.

In some embodiments, the 3D foot model features toes that rest flat on the same plane as the sole, while the 3D shoe last model has a sole that curves upward at the toe portion. In such a case, point cloud aligning 104 can incorporate some articulated motion of the toes. This relies on detecting the articulation axis, which can be done by detecting the front point where the interior arc of the foot is tangent to the ground.

Figure 3:
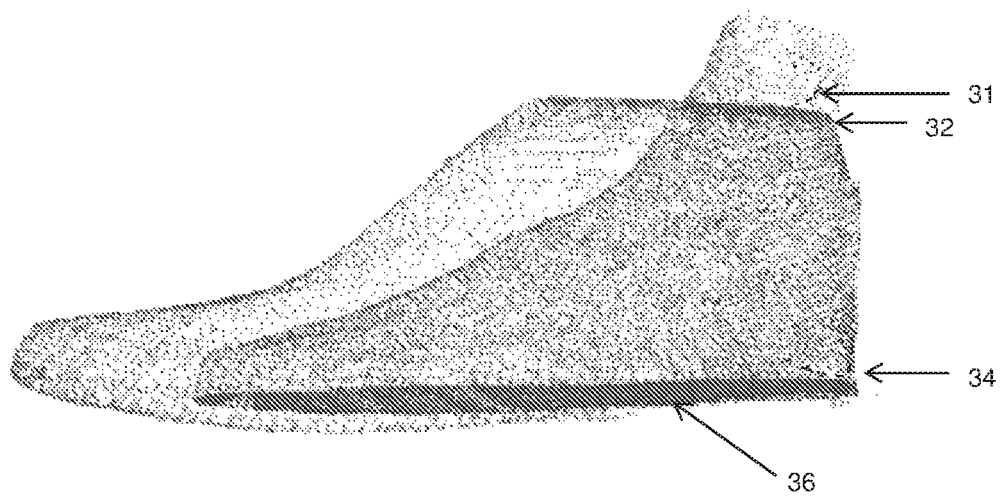
FIG. 3 is a pictorial representation of a point cloud aligning in accordance with certain embodiments of the presently disclosed subject matter.

Referring now to FIG. 3 there is illustrated a pictorial representation of a point cloud aligning in accordance with certain embodiments. As shown in FIG. 3, as a result of point cloud aligning 104, the two point clouds are aligned at least at points 36 (representing the sole), 34 (representing the two heel extreme points) and 32 (representing the foot point cloud's ankle back extreme point and the shoe point cloud's top back point). As shown in FIG. 3, the foot's ankle back extreme point is located at the bottom of, or just beneath, the malleolus 31.

Next, the system (e.g. using matching engine 512) calculates (105) one or more indicators of fit between the 3D foot point cloud and the 3D shoe last point cloud. An indicator of fit (referred to hereinafter also as fit indicator) can be characterized by a value indicative of certain aligning conditions. By way of non-limiting example, a fit indicator can be indicative of a good fit if the respective value is lower than a predefined fit threshold, and can be indicative of a bad fit if the respective value is higher than a predefined fit threshold. Fit indicators can be calculated for different regions of the 3D foot model and/or 3D shoe last model. Alternatively or additionally, a fit indicator between the 3D foot model and 3D shoe last model can be characterized by a single fit indicator (e.g. obtained as a weighted average for data points (and/or groups of data points) in the point clouds or otherwise).

In some embodiments, calculating a fit indicator 105 can be performed as follows. For a data point p in the 3D foot model point cloud, calculate the normal $n_p$ of the point cloud surface at the given point p, and consider the line $l_p$ passing through p and parallel to the normal $n_p$. Then, calculate the intersection point q between the line $l_p$ and the point cloud of the 3D shoe last. The distance between the two considered points (one on the foot p, and one on the shoe last q, both being the extreme points of a segment parallel to the normal) can be used to define the local distance between the foot point cloud and the shoe last point cloud at the location defined by p. The normal can be detected by calculating a covariance matrix at the vicinity of each point p, whereby the normal is the eigen-vector of the covariance matrix with respect to the smallest eigen-value. For each point p in the foot cloud, the intersection point of the line $l_p$ with the shoe last can be detected by moving a virtual sphere along the normal and selecting the point where the density of the 3D shoe last points within the sphere is maximal.

Local distances can be calculated for each data point in 3D foot point cloud or to a part thereof (e.g. data points in a certain region of the point cloud, data points matching a certain aligning conditions, etc.)

Once the local distances between the 3D foot model and 3D shoe last model are known, a value of a fit indicator for a region of the foot (which may comprise one data point or a plurality of data points) can be determined based on the local distances between the two point clouds corresponding to the given region (e.g. in accordance with the highest local distance, lowest local distance, average local distance, weighted average local distance, etc.). By way of non-limiting example, a good fit threshold for a region can be defined as |0.5 mm|. In such a case, a distance-based value of respective fit indicator (FI) calculated for this region as −0.5 mm<FI<0.5 mm is indicative of a good fit, while other values of the fit indicator are indicative of a bad fit. By way of alternative non-limiting example, a good fit can be defined by lowest threshold (e.g. equal to 0) and highest threshold (e.g. equal to 2.5 mm). In such a case, a distance-based value of respective fit indicator (FI) calculated for this region as 0<FI<2.5 mm is indicative of a good fit, while over values of the fit indicator are indicative of a bad fit. The thresholds used to determine the fit can be predetermined by the system or, optionally, can be configurable by a user. Thresholds can be also determined to enable more detailed fit gradation (e.g. tight fit, loose fit, good feet, perfect fit, etc.). Optionally, a system and/or a user can also determine the low and high thresholds for acceptable fit (optionally different for different regions).

In some embodiments, once the fit indicator(s) are calculated for one or a plurality of regions of the 3D foot model, the system can optionally color (107) the corresponding regions of the 3D foot model to graphically represent the one or more calculated fit indicators, and output the colored graphical representation of the 3D foot model to a display device (not shown). By way of non-limiting example, different colors can correspond to different fit gradations.

Referring now to FIG. 4, there is illustrated a non-limiting example of a 3D foot model colored in accordance with calculated fit indicators with respect to a particular shoe, according to certain embodiments. As shown in FIG. 4, the output can include, e.g., a 3D graphical representation of a foot comprised of a plurality of regions, the regions of the foot colored to show the "fit" with a particular shoe at the given region of the foot. Each region represents a distinct portion of the foot surface and is comprised of a plurality of data points, each data point associated with the same fit indicator (i.e. each colored portion represents a continuous area of a given fit). In some embodiments, the coloring can represent a good fit or a poor fit of shoe to a foot where, optionally, one color, for example, red can represent a tightness of −2.5-0 mm, e.g., a poorer fit, in a particular area of the shoe shown visually as red, and, optionally, a second color, for example, green can represent a good fit, e.g., 0-2.5 mm difference between the foot and the shoe in this area shown visually as green.

Figure 5:
FIG. 5 is a non-limiting example of a graphical display on a smartphone, in accordance with certain embodiments of the presently disclosed subject matter.

In some embodiments, the coloring scheme used can provide, prompt or otherwise result in the overt or implied recommendation for the shoe size to which it fits. In some examples, another color, and/or shade, for example, blue, can represent a looser area of the shoe of 2.5 mm and more, resulting in poor fit again, as a too big shoe. In some embodiments, a graphical display of the foot measurement in the shoe results can be provided to a user. The user can view the 3D graphical display, for example, on a desktop computing system and/or mobile computing system, for example, a smartphone, as shown, e.g. in FIG. 5. In some embodiments, the coloring scheme can be configured by the user according to predetermined criteria selected by the user, e.g., the user can provide values representing (e.g., in mm) tight fit, loose fit, and good fit, and/or the color to associate with each fit.

In some embodiments, a colored representation of the match engine results can be based on gap calculations between the foot and the shoe last 3D models as further described with reference to FIGS. 6 and 7. In some embodiments, if there is a gap difference at the toes that is =<0 then the color will be marked with a first color, for example, red, where if the gap difference is 0> and/or <2.5 mm, then the color will be marked with a second color, for example, green, and if the gap difference is >2.5 mm then the color will be marked with a third color, for example, blue. If the gap difference is >3.5 mm then the color will be marked with a fourth color, for example, white.

Optionally, the system can further be configured to provide a recommendation (106) based on the results of the virtual fit in accordance with the one or more calculated fit indicators. For example, the processor can be configured to analyze the fit indicators obtained for different regions and generate recommendations if the overall fit is a good fit, a poor fit, or average fit. In some embodiments, as detailed above, the system can include a shoe database including 3D models of a plurality of different shoes and different sizes of a given shoe. In such a case, providing a recommendation 106 can include analyzing, by the processor, fit indicators between the foot and different size(s) or model(s) of shoes stored in the databases, and recommending a different size shoe to try or a different model of shoe to try, as shown, e.g., in FIG. 12. Other recommendations can also be provided.

As has been detailed with reference to FIG. 2, the two point clouds of 3D models aligned can be the basis for the match engine between the 3D foot model and the 3D shoe last model. Once the two 3D models are placed as if, for example, on the same and/or similar plane, the match engine can calculate the positive and negative differences all around the 3D models or at certain reference points, and/or at one or more reference points as described, for example in FIG. 6, and based on the distances, the system can recommend a shoe fit or unfit.

The system can continue to align 3D shoe lasts incrementally, of the next size available in the 3D shoe last DB, and calculate all the differences between the two 3D models until the percentage of the negative results is less than a parametric % defined by the system. For example, if the results of calculating the differences between 3D shoe last size 9 and 3D foot are over 50% negatives results, meaning too many points of tight fitting, then the system will align the next 3D shoe last size in the DB and so on, until less than 15% negative results are achieved.

In some embodiments, a 3D foot model database, for storing data informative of a plurality of 3D foot models, can be stored, e.g., in a cloud environment. In some embodiments, the 3D foot model database can used, e.g., by commercial entities involved in, e.g., product planning, sales, etc. In some embodiments, a 3D foot model database can include one or a plurality of user profiles. A user profile can include unique and/or identifying user data, including but not limited to a user's personal details, including, e.g., shoe size, and 3D foot model.

In some embodiments, a 3D foot model can be extracted from the 3D foot model database to compare, interpolate, superimpose and/or otherwise compare a 3D shoe last model with a 3D foot model associated with a given user. The processor can be configured to return data, displayable, for example via a GUI, a 3D graphical representation of a foot position inside the shoe, the foot position inside the shoe as determined, for example by comparing the 3D model of the foot and the 3D model of the shoe last. The graphical user interface, and/or other outputs to a user can calculate and/or present a recommendation for a best size and fitting for the user based on said comparison.

In some embodiments, a shoe last data can be combined with other data, for example, data relating to materials associated with the desired shoe, wherein said materials can influence the fit of the user's foot into said shoe.

This database can be later used as a basis for a best fitted shoes recommendation engine, which will direct and display to the user, only the shoes that match the 3D foot model, where to buy them and where the best price is being offered.

Figure 6:
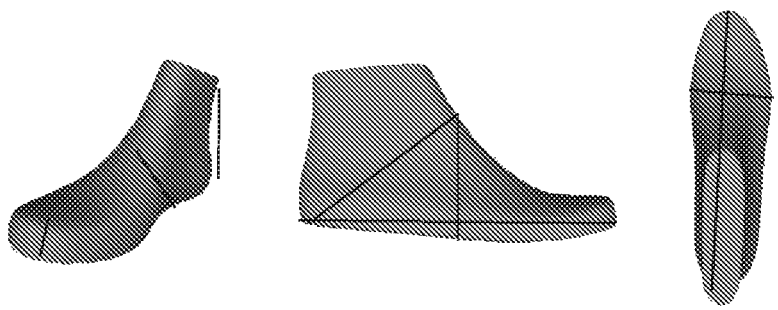
FIG. 6 is a pictorial representation of reference points of a 3D shoe last, in accordance with certain embodiments of the presently disclosed subject matter.

Referring now to FIG. 6, there is illustrated a pictorial representation of reference points of a 3D shoe last in accordance with certain embodiments. These reference points can be the only gap differences to be compared with the 3D foot model or all of the gap difference between the two 3D models can be compared. This can depend on the level of information provided on the shoe last by the shoe manufacturers, and/or other information or data.

A system can incorporate into a 3D representation of a shoe last, one or more reference points provided by shoe manufacturers and/or using industry standards for shoe measurements of one or more key points in a shoe to be later matched with a foot.

In some embodiments, these key points may include, but are not limited to the internal sizes: length from toe to heel 601, width from left to right in toes line 602, joint girth (not shown), waist girth, instep girth, long heel girth, short heel girth, distance between low back heel point and top of foot, height of arch and more.

Figure 7:
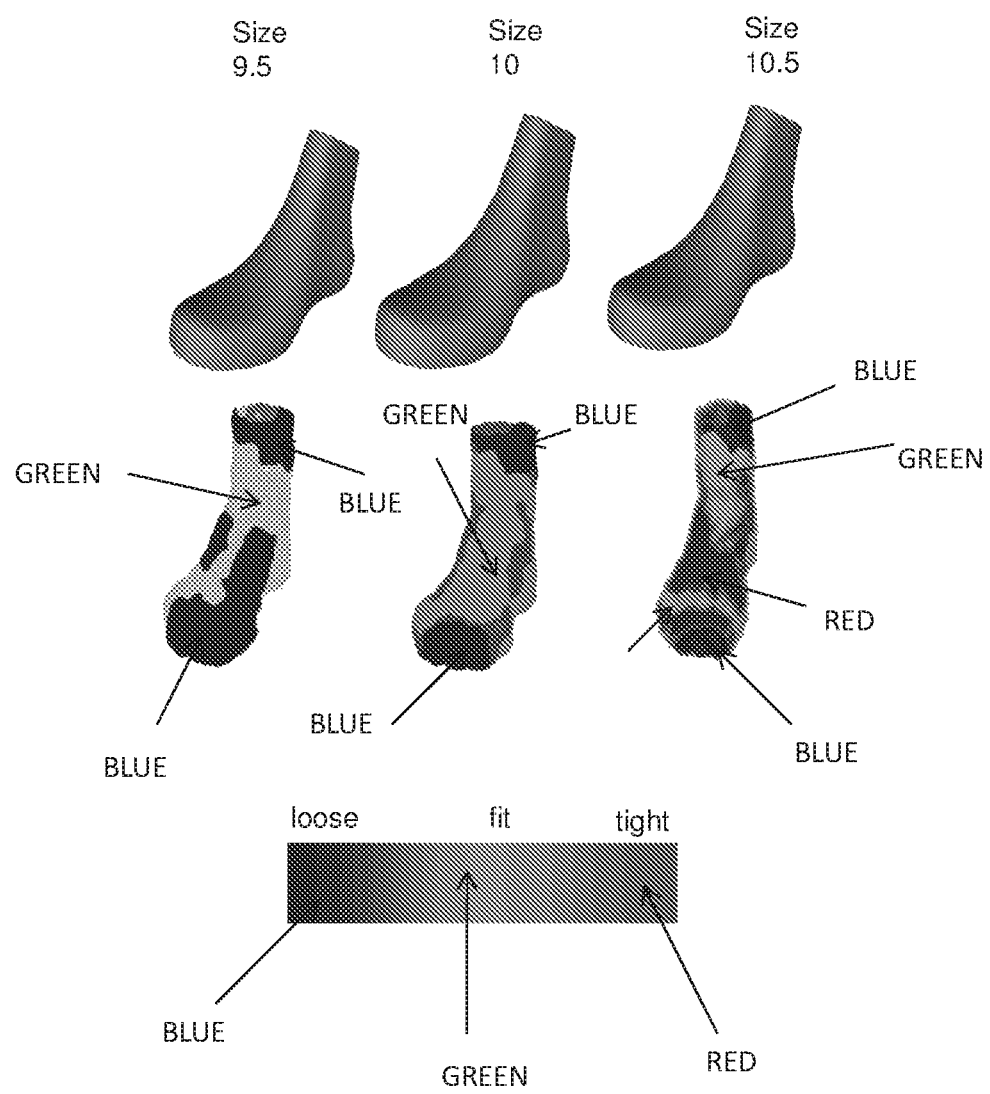
FIG. 7 is a pictorial representation of a virtual fitting, in accordance with certain embodiments of the presently disclosed subject matter.

Referring now to FIG. 7, there is illustrated a pictorial representation of a virtual fitting of various 3D shoe lasts in accordance with certain embodiments. The figure presents a foot 3D model along three 3D models of lasts of shoes that were scanned from the inside. The same key references will be measured for each shoe size against the foot to determine best fit.

Differences can be measured using mathematical models, statistical models, and/or other methods.

In some embodiments multiple types of lasts can be used. Based on the determined 3D foot model size, the 3D foot model is measured against a 3D shoe last matching size according to industry standard. If the differences points measures represent overlapping or tightness in any of the measured points, the system will compare the next size of 3D shoe last model until a better fit is found.

In some embodiments, a digital version of a last includes the following data: complete 3D reconstructed model, and/or points of reference such as heel to toe, arch height, heel to ankle, toe to ankle, joint girth, waist girth, instep girth, long heel girth, short heel girth and more.

In some embodiments, differences of greater or less than 2.5 mm are regarded as not fitted.

By way of non-limiting example, the detailed above 3D foot models can be obtained with the help of a 3D modeling process, e.g. using the 3D foot reconstruction process described herein in accordance with certain embodiments of the presently disclosed subject matter. Referring now to FIG. 8, there is illustrated a generalized flow chart of generating a 3D foot reconstruction, in accordance with certain embodiments. The system, e.g. using a graphical user interface (GUI) directs (108) a user to capture a first image, e.g. a snapshot, depicting a substantially planar surface having non-patterned and non-repetitive markings, for example a newspaper, thereby obtaining a reference image of the planar surface. The system further directs (110) the user to prepare a scanning area for scanning the foot (as will be detailed below with reference to FIG. 9), and to capture a sequence of second images depicting the scanning area from different angles by performing a foot scan (112), e.g. using camera 550. As will be detailed below, the scanning area comprises the planar surface (e.g. a newspaper) having been placed thereon the foot and a substantially planar reference object having known dimensions (e.g. a credit card). The system then obtains the sequence of second images and generates (114) a 3D foot reconstruction, e.g. using 3D reconstruction module 514, as will be detailed below with reference to FIG. 10.

Figure 11:
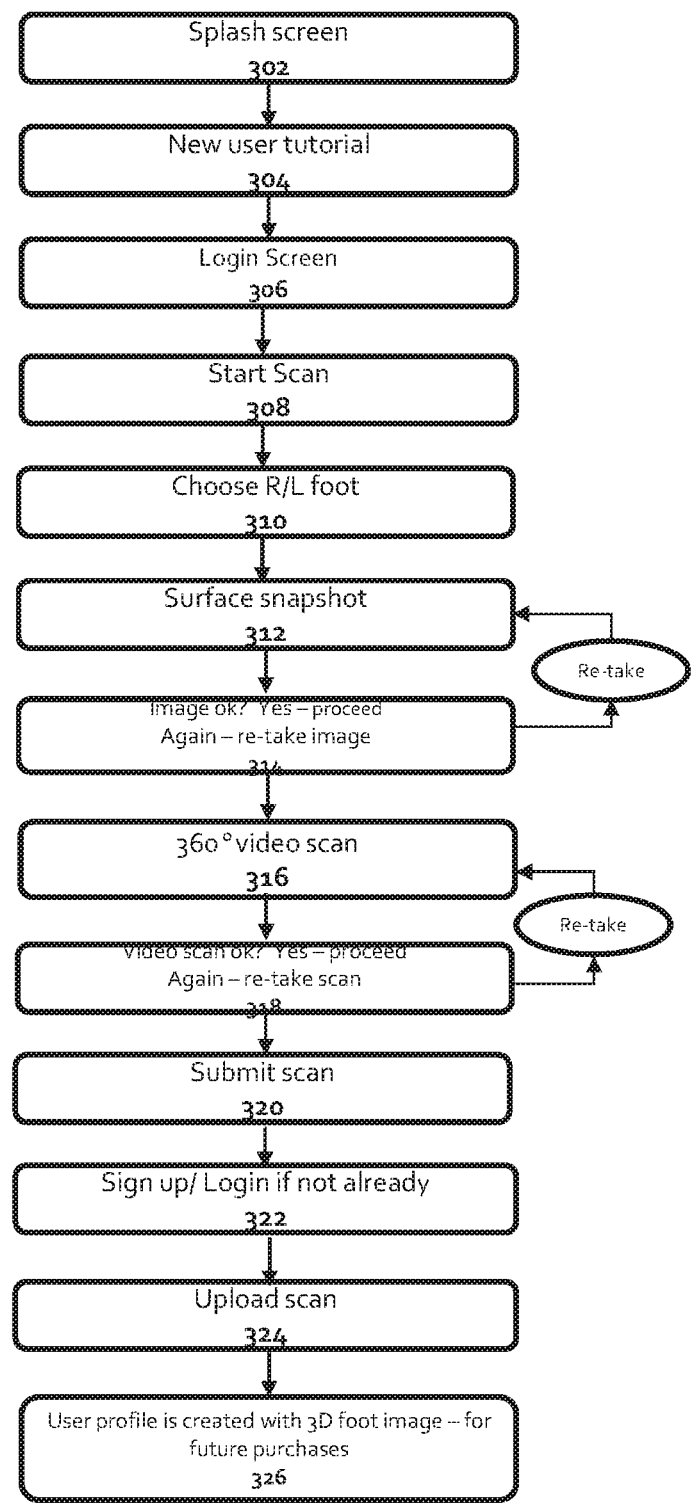
FIG. 11 is a schematic diagram of an execution process flow for a mobile device, in accordance with certain embodiments of the presently disclosed subject matter.

In some embodiments, the system can include providing downloadable executable code for download to a user's mobile device for performing a foot scan 112, as will be detailed below with reference to FIG. 11. In some embodiments, the executable code can include functionality for providing directions to the user 108-110. In some embodiments, the code can include a GUI. In some embodiments, the code can include functionality for uploading the foot scan to a server for generating the 3D reconstruction 114.

Figure 9:
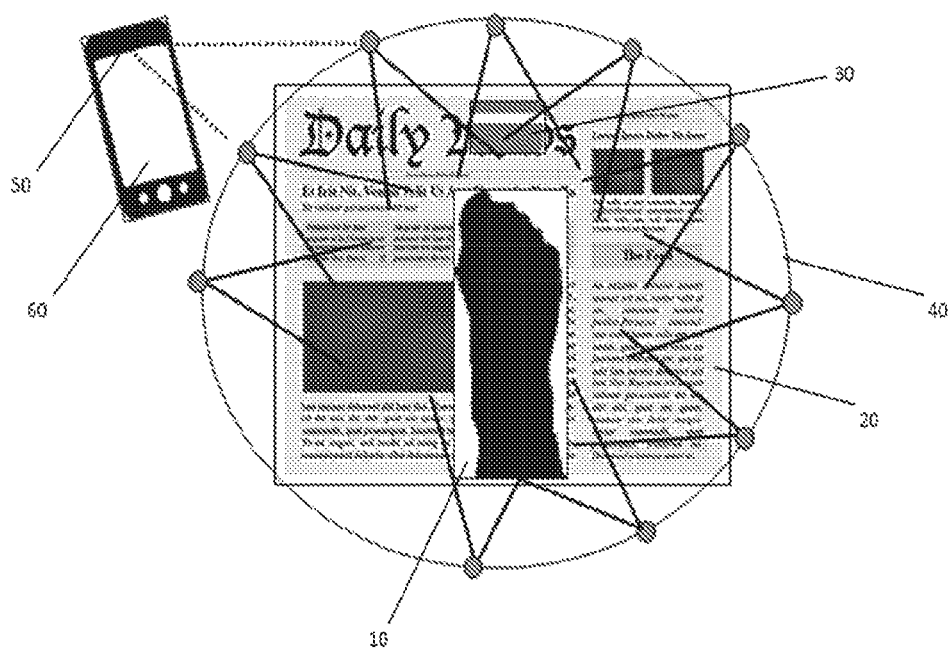
FIG. 9 is a schematic illustration of a foot scan process, in accordance with certain embodiments of the presently disclosed subject matter.

Referring now to FIG. 9, there is illustrated a schematic illustration of a foot scan process 112, in accordance with certain embodiments. Scanning area 40 comprises a scanning surface 20, shown by way of non-limiting example as a newspaper, whereon is placed a foot 10 (or other body part to be scanned) and a reference object 30, shown by way of non-limiting example as a credit card. The process of scanning the foot includes capturing a plurality of 2D images of the scanning area from a plurality of angles. In an exemplary embodiment, a substantially 360 degree video of a scanning area 40 is captured using a video camera of a mobile device. In such a case, consecutive frames of the video are treated in the description provided herein as consecutive second images.

Scanning surface 20 is a substantially planar object having visible non-patterned and non-repetitive markings (e.g. text, graphics, etc.), e.g., a newspaper, poster, etc. It should be noted that any text and/or graphics on scanning surface 20 will not affect the scanned image, as will be detailed below. In some embodiments, scanning surface 20 can be a specially designed scanning surface supplied to the user specifically for performing the scan. It should be noted that scanning surface 20 is the same surface that is imaged by the user in step 108 of FIG. 8.

In some embodiments, foot 10 can be covered with a colored and/or textured sock.

In some embodiments, reference object 30 can be any substantially planar object having known dimensions, such as standard measurements, e.g. a credit card, store card, driver's license, etc.

In some embodiments, the 360 degree video can be captured, e.g., by a mobile device 60 equipped with a camera 50. In some embodiments, mobile device 60 can be, e.g., a mobile phone including a smartphone. In some embodiments mobile device 60 can be a device capable of direct and/or indirect Internet access. In some embodiments mobile device 60 may be configurable for commerce, ecommerce and/or other uses. In some embodiments mobile device 60 may be associated with a gaming system, a computer system or another system.

In some embodiments, mobile device 60 can include one or more sensors 55, e.g. gyroscopes, accelerometers, and/or other sensors.

In some embodiments, the 360 degree video can be captured by having the user point camera 50 at foot 10 while simultaneously moving mobile device 60 around scanning area 40 such that sufficient information is acquired by camera 50 to create a 3D model of foot 10. In some embodiments, acquiring sufficient information includes the capturing plurality of 2D images of foot 10 from different angles. In some embodiments, acquiring sufficient information includes capturing a 2D video of foot 10 including frames captured from different angles. In some embodiments, acquiring sufficient information may require camera 50 to move around foot 10 in a circular fashion. In some embodiments, camera 50 is moved around foot 10 in a circular-like, spheroid, and/or other fashion. In some embodiments camera 50 can be moved around foot 10 one or a plurality of times.

In some embodiments, the user can be provided with scanning instructions via a smartphone application downloadable to user's mobile device 60. In some embodiments, the user can initiate the scan process using the smartphone app, which can be configured to operate camera 50. In some embodiments, the user can initiate the scan process by operating camera 50 using the native controls provided by mobile device 60. In some embodiments, the smartphone app can include a graphical user interface (GUI).

In some embodiments, the user can be instructed (e.g. via the GUI) to change, manipulate and/or alter the lighting of the environment, and/or the location of foot 10. In some embodiments the user can be instructed the user to alter the position or orientation of foot 10.

In some embodiments, the user can be instructed (e.g. via the GUI) to upload the snapshot of scanning surface 20 and scan of scanning area 40 to a server for performing a 3D reconstruction of the foot and virtual fitting.

Figure 10:
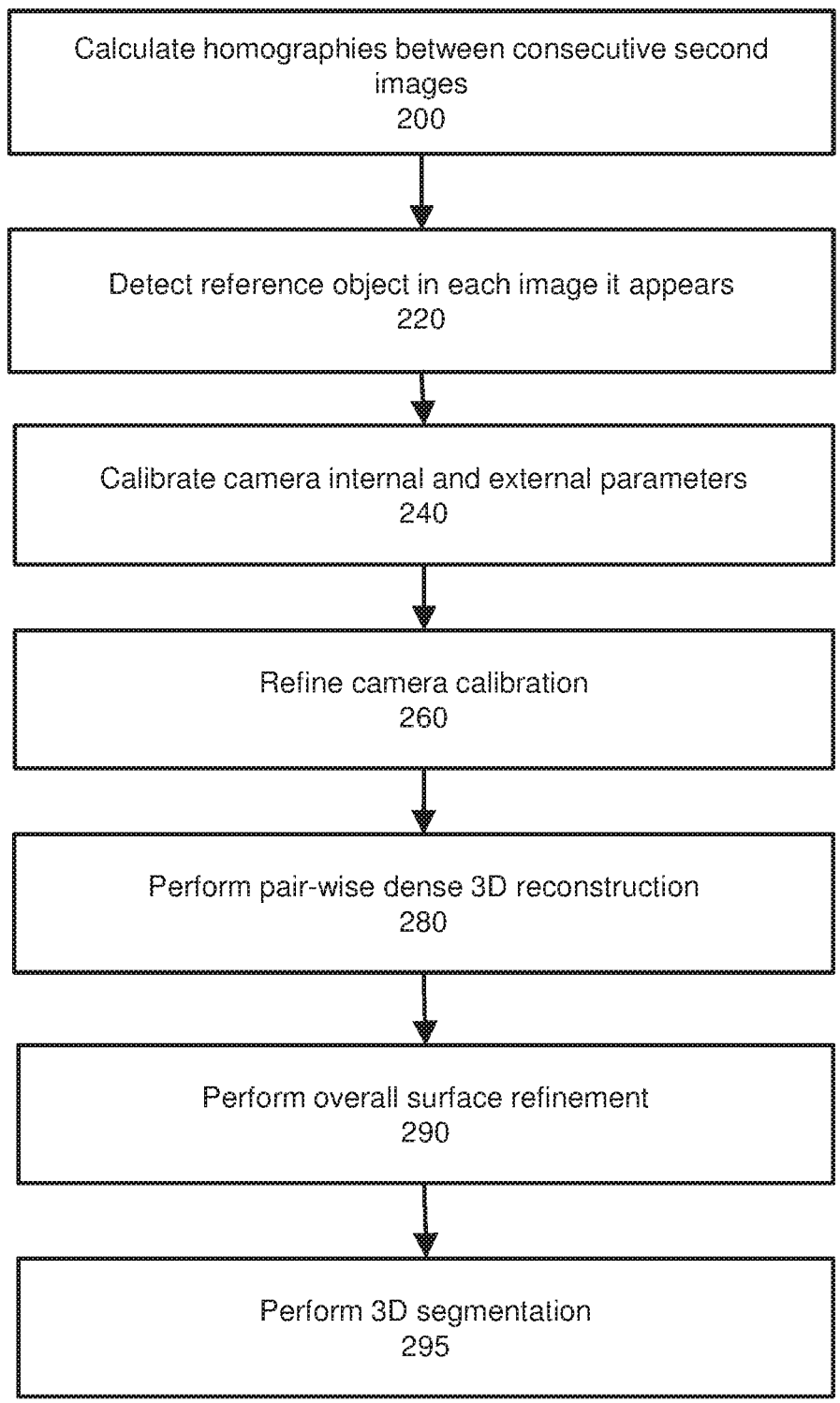
FIG. 10 is a generalized flow chart of generating a 3D foot reconstruction, in accordance with certain embodiments of the presently disclosed subject matter.

Referring now to FIG. 10, there is illustrated a generalized flow chart of generating a 3D foot reconstruction 114 in accordance with certain embodiments. After having obtained the reference image and the sequence of second images $\{I_i, I_{i+1}\}$ (depicting the scanning area 40 at different angles), processor 510 can be configured (e.g. using 3D reconstruction module 514) to calculate (200), for each pair of consecutive images, the homography $G_{i,i+1}$ through the surface plane between the images of the pair. The homographies can be calculated, e.g., by detecting salient point features in each image I and matching detected salient points in consecutive images $I_i, I_{i+1}$. In some embodiments, salient point feature detection can be performed using one or more algorithms including, e.g., (A) KAZE, SIFT, SURF, DAISY, ORB, BRISK, Classical Harris Detector, and/or other suitable algorithms known in the art. In some embodiments, matching salient points detected in consecutive images can be performed using, e.g., a corresponding descriptor and metric for a given kind of salient detector (like the above algorithms).

In addition to detecting discrete salient features, the process can include analyzing an overall image similarity measure. These two cues (e.g., the mix of discrete salient features or key points, and overall image measures) can be used at different stages. In a first stage, the homographies can be computed using the matches outputted by the salient features detection and matching, while filtering the wrong correspondences through a robust statistical technique, optionally, a technique such as RANSAC, Bayesian Robust Regression (BRR) or other suitable techniques known in the art, like a deterministic approach or another robust statistical algorithm.

In some embodiments, one method of filtering can be performed as follows. Given a set of matching points:

$$(p_i, q_i)_{i=1,\ldots,N}$$

The method can be configured to reject outliers and/or to compute the homography G that minimizes the geometric square errors for inliers:

$$\sum_k d(Gp_k, q_k)^2$$

In some embodiments, the matching points can be provided as homogeneous coordinates.

In some embodiments, the method can also incorporate line matches:

$$(a_i, b_i)_{i=1,\ldots,N}$$

Once wrong matches are filtered out, the homography can be calculated as the homography that minimizes:

$$\sum_k d(G^t b_k, a_k)^2$$

In some embodiments, a RANSAC filtering can be performed to discard wrong matches between pairs of points, wherein the threshold can be automatically computed relying on, for example, mean-shift techniques.

Other robust methods can also be used in order to discard wrong matches, e.g., robust Bayesian methods, deterministic Branch and Bound methods, etc.

In serial or in parallel with the above filtering, a second layer of filtering can be performed using e.g., an m-estimator robust fitting and/or other fitting methods. Finally, the result of the filtering can be refined, e.g., using a sum of square errors minimization, such as, for example, the Levenberg-Marquardt method.

If an overall image similarity measure is used to calculate the homographies G, such as enhanced correlation coefficient (ECC), if the ECC falls under some threshold in the neighborhood of the key points, the homography can be refined by maximizing the ECC. This similarity measure can be defined as:

$$ECC(I_1, I_2) = \frac{\bar{x}_1^t \bar{x}_2}{\|\bar{x}_1\| \cdot \|\bar{x}_2\| + \epsilon}$$

Where $\bar{x}_i$ is the vector of all pixels obtained after subtraction of the arithmetic mean of the image, $\|x_i\|$ is the Euclidean norm, and $\epsilon$ is a constant to avoid a zero denominator.

Alternatively, the homography can be refined by minimizing an edge matching measure, or any other image similarity measure.

Optionally, the two cues (i.e. salient point features and overall image similarity) can be embedded in a single optimization scheme.

Next, processor 510 can be configured to detect (220) reference object 30 in each second image it appears (220). The detection process can be based at least in part on differences between the reference image (depicting the planar surface without the reference object) and each second image (depicting the scanning area from different angles). In some embodiments, reference object detection 220 can be performed as follows.

First, each image I in the sequence of images $\{I_1, \ldots, I_i, \ldots I_n\}$ is compared with the reference image $I_k$ depicting surface 20 without the foot and reference object placed thereon, as detailed above. The comparisons can be performed by, e.g., calculating a set of homographies $J_k$ between the reference image $I_k$ and each image I in the sequence of images through the surface plane. Using homographies $J_k$, reference image $I_k$ can be aligned with each image I in the sequence (or equivalently each image I in the sequence can be aligned with reference image $I_k$), and a new sequence of images $\{D_1, \ldots, D_n\}$ can be obtained by subtracting from each image $I_i$, $I_{i+1}$, etc., the respective aligned reference image $I_k$. As a result of the subtractions, the new sequence of images $\{D_1, \ldots, D_n\}$, represents the difference between the original sequence of images and the reference image, after alignment thereto. It should be noted that prior to performing the subtraction, the images I in the original sequence of images can first be converted from RGB to HSV color space, in which case the H (Hue) channel can be used for the subtraction.

After performing the subtraction, the processor can be configured to apply a mathematical morphology process to each image in the new sequence of images in order to detect the reference object in each image it appears. More precisely, the processor can apply an adaptive thresholding process to the images (using, e.g., the Otsu method, k-means clustering, etc., or any other suitable method for segmenting the image histogram into two separate classes). Subsequently, the processor can process the images using a morphological filtering (opening followed by closing), and discard blobs that touch the image borders and focus on blobs within the image interior. Next, the processor can detect the blob whose size and shape is the closest match for a rectangle (under a perspective projection), using e.g., morphological opening. This process produces a marker within the candidate blob and a marker in the background. Next, a segmentation step can be performed (e.g., watershed morphological segmentation, graph-cut segmentation, etc., as well as others). Finally, the edges of the reference object can be refined using line detection (such as, e.g. Hough transform). The corners of the reference object can then be detected as the intersections of the edges.

Next, processor 510 can be configured to calibrate (240) camera internal and external parameters. Calibration 240 can be achieved through one or more approaches, including, for example, fundamental matrix or tensor based methods and/or homography based methods. Fundamental matrix based methods can include, for example, one or more methods that rely on the computation of fundamental matrices or trifocal tensors between consecutive images. The computation of the fundamental matrix, or the trifocal tensor, can be accomplished by one or a plurality of methods, including from two images or three images in the sequence of images, or from discrete measurements, including, for example, points and/or lines (in the case of the trifocal method).

Optionally, fundamental matrix can be calculated by a two-step approach: first a homography estimation and subsequently an epipole estimation.

Once the fundamental matrices and/or trifocal tensors are computed all over the sequence of images, a self-calibration process can be employed in order to compute the internal and external camera parameters. Self-calibration can include one or more of the following methods, including Kruppa equations based methods, dual absolute quadric based methods, essential matrix singular values properties based methods, and/or other methods known in the art.

As detailed above, in some embodiments, calibration 240 can also be performed using homography based methods as an alternative approach to the fundamental and/or trifocal tensor based approaches. For example, a homography $G_k$ through the planar surface can be computed between consecutive images in the sequence of images, following which self-calibration can be achieved using, e.g., Euclidean homographic properties mixed with normal plane estimation (A Euclidean homography is obtained by canceling the internal parameters influence in the homography), or by using the properties of the homographics $H_k$ between the ground plane and the images, and/or other methods including, e.g., methods whereby a homography is calculated using a combined algorithm which mixes discrete features (salient point) and overall image similarity measure.

In some embodiments of the currently disclosed subject matter, following homography calculation, the system can proceed to a semi self-calibration stage. For semi self-calibrations, some or all for the following can be assumed, including the focal is first assumed to be constant over the whole sequence of images; the principal point is assumed to be at the image center; the skew is zero; and the pixels are square. These assumptions are not mandatory however.

In some embodiments, calibration 240 can include fixing the scale based at least partly on the calculated homographies and parameters of the detected reference object in the second images. The scale can be determined, e.g. as follows. Reference object 30, having known dimensions, can be detected in the images in which it appears, as detailed above. In images in which reference object 30 does not appear, calibration 240 can include virtually "transferring" the reference object to the image for the purpose of fixing the scale. This transferring step is performed using the homographies $G_{i,i+1}$ computed between consecutive frames of the video sequence as explained above. After the reference object can be considered as known in every image of the sequence. In an image k, where the reference object is known, one can compute the homography from the surface to the image plane: $H_k$ as follows. The reference object is known to be a card with known dimensions. The card corners have been detected before and are used here to compute the homography $H_k$.

Assuming the reference plane (i.e. the planar surface) is at z=0 in some orthonormal coordinate system, where the z-axis is orthogonal to the reference plane and points toward the camera, this homography can be decomposed as follows: $H_k=\lambda_k K_k[R_k I_{3\times 2}, t_k]$, where $K_k$ is the internal camera matrix at image k, while $R_k$ and $t_k$ are the external parameters at the same image. Here and in the sequel, $I_{3\times 2}$ denotes the two first columns of the 3×3 identity matrix. As a matter of fact $\lambda_k$ is an unknown non-zero scalar.

Then the product $K_k^{-1}H_k I_{3\times 2}$ is proportional to the two first columns of the rotation matrix $R_k$. Hence the singular values of this matrix must be equal.

The internal camera matrix can then be computed as the one among valid matrices that minimizes $\log(\sigma_1/\sigma_2)$, where $\sigma_1 \geq \sigma_2$ are the singular values of $K_k^{-1}H_k I_{3\times 2}$.

The minimization can be done by mixing all images where the reference object appears, assuming different focal lengths of each images, but of course identical principal points (and maybe skew). The optimization can be constrained by requiring that the gaps between the different focal lengths could not exceed some upper bound.

Once the two first columns of the rotation matrix $R_k$ are known, the third one is calculated being orthogonal to the two first ones and oriented in such a manner that $\det(R_k)=1$.

Next, processor 510 can be configured to refine the overall camera calibration (260). In some embodiments, camera calibration refinement 260 relics on the "good" matches that have been identified during the computation of the homographics $G_{i,i+1}$. These good matches are made of genuine correspondences between consecutive images in the sequence of images of points that lie on the planar surface in the real world. They serve that raw data and are reconstructed in 3D using an optimal triangulation algorithm. By construction, these reconstructed points are supposed to lie over the reference plane (defined by z=0). The cameras are then refined by minimizing the sum of square distances between these points and the reference plane.

In some embodiments, the refinement step can also include minimizing the re-projection error. In some embodiments, during the refinement step the radial distortions of the camera can also be estimated.

In some embodiments, the calibration algorithm can also include knowledge coming from phone sensors (e.g. gyroscope and accelerometer). These measurements outputted by these sensors should be tracked and filtered by some Sequential Bayesian Filtering (e.g. Kalman Filter, Particle Filter, etc.). Then, this provides some knowledge about the location of the camera in space, which can be mixed with the output of the card based calibration. Sensor fusion can be carried out by a range of methods, among which the Bayesian approach is probably the golden way to proceed. See, e.g., Bayesian fusion: Modeling and application by Sander, J.: Beyerer, J. in Workshop on Sensor Data Fusion: Trends, Solutions, Applications (SDF), 2013, for a general presentation of this approach.

Next, processor 510 can be configured to calculate a pair-wise dense 3D reconstruction (280) using one of various different approaches are known in the art. One approach includes obtaining, e.g. using stereo vision, a pair-wise dense reconstruction, and stacking together the outputs the pair-wise dense reconstructions. See, e.g., stereo vision algorithm presented in Optic Flow Goes Stereo: a Variational Method for Estimating Discontinuity-Preserving Dense Disparity Maps, by Natalia Slesareva, Andres Bruhn, and Joachim Weickert.

Next, processor 510 can be configured to refine (290) the surface of the 3D reconstructed model. Surface refinement 290 can be performed by, e.g. minimizing an energy that ensures both some regularity of the surface in the three-dimensional space and that the surface re-projection fits well with the images. In this context, one can compute for instance the surface Σ that minimizes the following energy:

$$E(\Sigma) = \int_\Sigma \Phi(s, n(s)) dA(s)$$

Where $dA(s)$ is surface element at s and $n(s)$ the normal. In the context of 3D reconstruction, Φ can be defined as in, e.g., "Weighted Minimal Hypersurfaces and Their Applications in Computer Vision", B. Goldlucke and M. Magnor, by the following expression:

$$\Phi(s, n(s)) = \frac{-1}{V_s(V_s - 1)} \sum_{i,j=1}^{l} v_i(s) v_j(s) \chi_{i,j}(s, n(s))$$

Where $v_k(s)$ denotes whether or not s is visible in camera k and $\chi_{i,j}(s,n(s))$ is defined by:

$$\chi_{i,j}(s, n(s)) = \frac{1}{A(W(s, n(s)))} \int_{W(s,n(s))} \left(I_i \circ \pi_i - \overline{I}_i^{s,n(s)}\right) \cdot \left(I_j \circ \pi_j - \overline{I}_j^{s,n(s)}\right) dA$$

Here $W(s,n(s))$ denotes the surface area around point s and $A(W(s,n(s)))$ its area, $\pi_k$ the projection performed by camera k, $I_k$ the image k and finally the mean values are computed using:

$$\overline{I}_i^{s,n(s)} = \frac{1}{A(W(s, n(s)))} \int_{W(s,n(s))} I_i \circ \pi_i dA$$

Another approach can be also used, which produces a refined 3D reconstruction without any initial guess. More precisely, the initial guess is obtained as part of the dense reconstruction process. Here again there exists a plethora of approaches. For an exemplary approach, see, e.g., Yasutaka Furukawa and Jean Ponce, "Accurate, dense, and robust multi-view stereopsis," IEEE Trans. on Pattern Analysis and Machine Intelligence, vol. 32, no. 8, pp. 1362-1376, 2010.

Once the 3D scene has been refined, processor 510 can then perform a segmentation (295) process to the scene in order to extract the foot from the scene (which also includes the planar surface). Segmentation 295 can be performed by, e.g.: (i) detecting the dominant plane in the scene, (ii) extracting all points that do not lie on the dominant plane, (iii) determining, from the extracted points, which plurality of points together form the dominant object of the scene thereby isolating the data points lying on the surface of the 3D reconstruction. In certain embodiments, the "dominant" object can be considered the object that is the largest object and the most centrally positioned object in the scene.

Detecting the dominant plane can include applying a robust statistical approach, e.g., RANSAC or Robust Bayesian Regression. All points rejected by the statistical fit of the dominant plane can then be extracted from the scene and processed, e.g. using Euclidean cluster extraction, to determine the dominant object. In some embodiments, once the dominant object, i.e. the foot, is detected, the processor adds a planar structure at the bottom of the dominant object for the purpose of the matching with the shoe last. Once the matching is performed, this planar structure is discarded.

It is noted that the currently disclosed teachings related to 3D reconstruction of an object are applicable, likewise, to 3D reconstructing the objects for different purposes. By way of non-limiting example, the disclosed technique can be used for 3D reconstruction of objects for 3D printing, for modeling and analyzing prosthetics in the medical field, for 3D matching body parts for security purposes, etc.

In certain embodiments, the system can include a mobile device configured to scan a foot and upload the scan for remote processing and one or more of 3D reconstruction, virtual fitting, and providing recommendations. Referring now to FIG. 11, there is illustrated a schematic diagram of an execution process flow 300 for a mobile device configured according to the disclosed subject matter. In some embodiments, certain tasks in process flow 300 can be initiated by a user via user input, e.g. using a graphical user interface (GUI) in a mobile application downloaded to the mobile phone. In some embodiments a user can interact with the mobile application by depressing buttons on a key pad or activating screen elements such as touch-sensitive screen icons. In some embodiments, a user can interact with the mobile application using other means, such as voice commands, gestures, movements, etc. Certain other tasks in process flow 300 can be initiated by the system without user input.

In some embodiments, process flow 300 can include providing a welcome or splash screen 302, e.g. to the user's mobile device. In some embodiments process flow 300 can include providing a user tutorial 304 (e.g. text-based tutorial, video-based tutorial, pictorial-based tutorial, combinations thereof, etc.). In some embodiments a user may be given the option to skip the tutorial.

In some embodiments, process flow 300 can include providing a login screen 304. In some embodiments, a user can login via an organic login (i.e. a login created and used specifically for interacting with the system). In some embodiments, a new user can be prompted to create an organic login. In some embodiments, a user can login with a third party login, such as a login used for social networks (e.g. Facebook, Linkedin, Twitter etc.). In some embodiments, user login information can be entered automatically from data in the user's sensor or device, and/or other information. In some embodiments login data can be entered automatically, semi automatically and/or manually. In some embodiments, the user login can be associated with a user account in a system for scanning a foot and virtual fitting.

In some embodiments, process flow 300 can include providing a "start scan" screen 306. The start scan screen can include a prompt to start a new scan. The prompt can include an instruction to the user to initiate a scan.

In some embodiments the parameters for the scan may be fixed. For example they may be fixed such that in camera mode there is fixed focal length. The camera may be configured to obtain images in a 0.5 second interval and be limited to less than 100 pictures. Other parameters can also apply. The parameters can be alterable either automatically, semi automatically or manually In some embodiments, process flow 300 can include providing a "foot selection" screen 308. The foot selection screen can include a prompt instructing the user to activate an activateable element for selecting either a right foot or a left foot for scanning.

In some embodiments, process flow 300 can include providing a "surface snapshot" screen 312. The surface snapshot screen can include a prompt instructing the user to activate an activateable element for taking a still photo of surface 20, and optionally, an instruction to the user for capturing a photo of surface 20 without foot 10 or reference object 30. In some embodiments, process flow 300 can include capturing a still photo using the device camera. In some embodiments, process flow 300 can include analyzing the photo quality 314. In some embodiments, process flow 300 can include providing a prompt for the user to re-take the snapshot in the event that the captured photo is of poor quality.

In some embodiments, process flow 300 can include providing a "360 degree video scan" screen 316. The start video scan screen can include a prompt instructing the user to activate an activateable element for performing a 360 degree video scan, and, optionally, an instruction for performing a 360 degree video scan by aiming the camera at the scanning area and moving the device in a circular motion 360 degrees around the scanning area. In some embodiments, process flow 300 can include capturing a 360 degree video scan using the device camera. In some embodiments, process flow 300 can include analyzing the video quality 318. In some embodiments, process flow 300 can include providing a prompt for the user to re-take the video in the event that the captured photo is of poor quality.

In some embodiments, process flow 300 can include a providing a "submit scan" screen 320. The submit scan screen can include a prompt instructing the user to activate an activateable element for submitting the video scan and/or the snapshot, e.g. by uploading to a remote server. In some embodiments, once activated, if the user has not already logged in via login screen 304, process flow 300 can, at this point, provide the user with a login screen 322.

Process flow 300 can continue by uploading the scans 324, e.g. to a server, and associating the uploaded scan with a user profile associated with the login credentials entered by the user in 304 or 322. In some embodiments, a new user profile can be created 326 if there is no existing user profile associated with the login credentials used by the user. Images obtained by the camera can be uploaded to a remote server. The images can be raw and/or processed prior to upload to a remote server. In some embodiments, a user can select to have images uploaded to a remote server only while the camera or mobile device is connected via a Wi-Fi connection. In some embodiments, process 300 can include providing an indication of a successful upload.

In some embodiments, additional functionality can be included. In some embodiments, the first shoe last 3D model to be aligned with 3D foot model will be determined by the size that end consumer registered as his standard size during the signing in process as described in FIG. 11, and taking the length of the foot model as the basis. For example the end-consumer standard size is a 39 European size, and the length of his foot from toe to heel is 24 cm, then the first 3D shoe last to be compared to is size 39 and/or at least 24 cm shoe last length. If the length is smaller than the foot, the system will align the next size up in the 3D shoe last DB.

Figure 13:
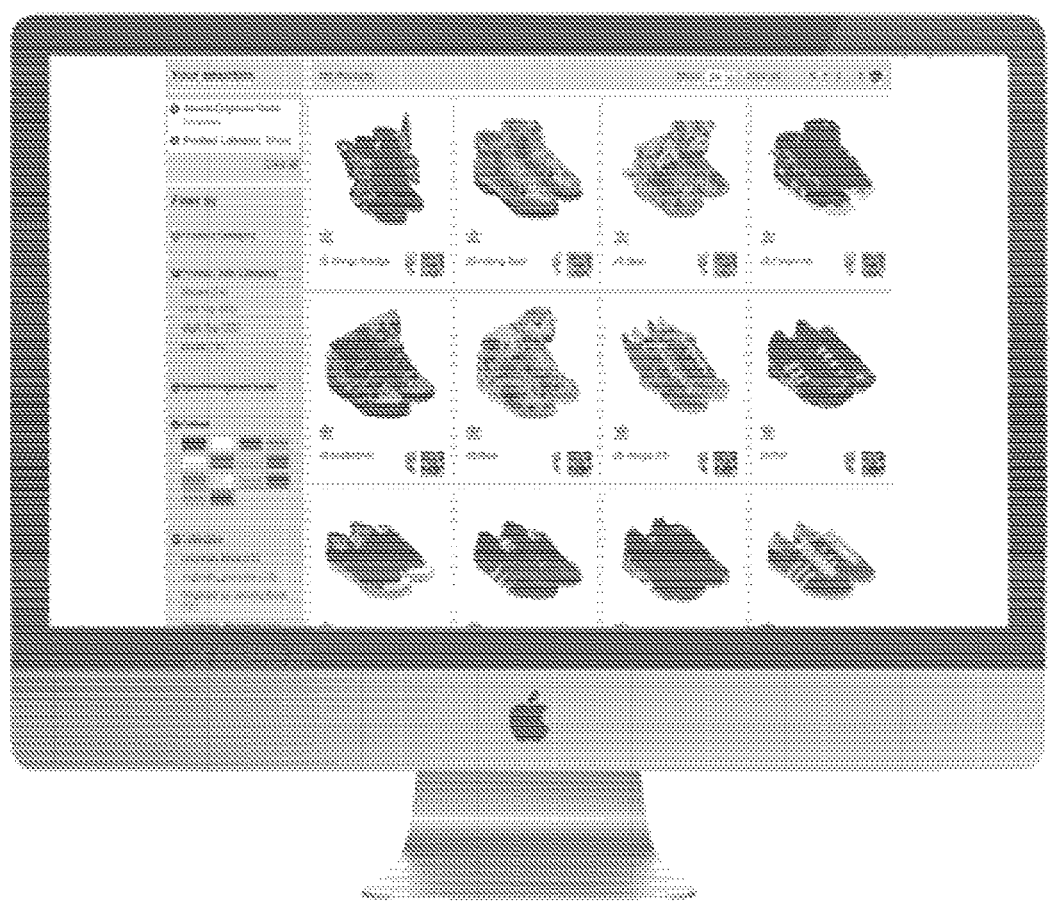
FIG. 13 is a non-limiting example of an e-commerce GUI, in accordance with certain embodiments of the presently disclosed subject matter.
Figure 14:
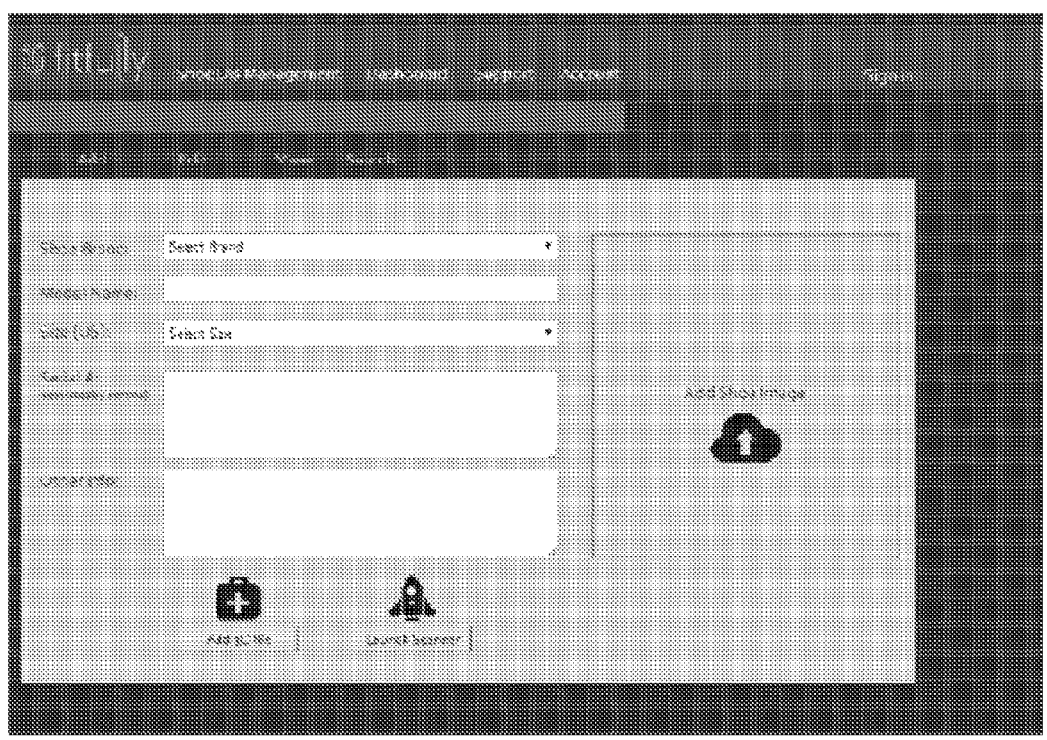
FIG. 14 is a non-limiting example of a graphical shoe management interface, in accordance with certain embodiments of the presently disclosed subject matter.

Referring now to FIGS. 12, 13 and 14 there are illustrated non-limiting examples of e-commerce graphical user interfaces (GUI) in accordance with certain embodiments. FIG. 12 illustrates non-limiting examples of screens of a smartphone app in a system for analyzing virtual fit. FIG. 13 illustrates a non-limiting example of an e-commerce GUI, for example a screenshot where multiple shoes can be presented for sale and one or more users can select a shoe for a virtual fit by a system, for example the system described herein by clicking on the icon alongside the desired shoe, and/or otherwise indicating a selection. FIG. 14 is an example of a graphical shoe management interface, in some embodiments, an Internet based interface for use in interfacing with an e-commerce site selling shoes, according to an embodiment of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways.

In embodiments of the presently disclosed subject matter, fewer, more and/or different stages than those shown in FIGS. 2, 8, 10 and 11 may be executed. In embodiments of the presently disclosed subject matter one or more stages illustrated in FIGS. 2, 8, 10 and 11 may be executed in a different order and/or one or more groups of stages may be executed simultaneously. FIG. 1 illustrates a general schematic of the system architecture in accordance with an embodiment of the presently disclosed subject matter. The modules in FIG. 1 can be made up of any appropriate combination of software, hardware and/or firmware that performs the functions as defined and explained herein. The modules in FIG. 1 can be centralized in one location or dispersed over more than one location. In other embodiments of the presently disclosed subject matter, the system can comprise fewer, more, and/or different modules than those shown in FIG. 1.

It will also be understood that the system according to the disclosed subject matter may be implemented, at least partly, as a suitably programmed computer. Likewise, the disclosed subject matter contemplates a computer program being readable by a computer for executing the method of the disclosed subject matter. The disclosed subject matter further contemplates a machine-readable memory tangibly embodying a program of instructions executable by the machine for executing the method of the disclosed subject matter.

Those skilled in the art will readily appreciate that various modifications and changes can be applied to the embodiments of the presently disclosed subject matter as hereinbefore described without departing from its scope, defined in and by the appended claims.

The invention claimed is:

1. A method of virtual fitting of a foot with a shoe, the method comprising, by a processor:
    obtaining data informative of a first 3D model associated with the foot, the first 3D model having a first point cloud comprising a plurality of data points representing the surface of the first 3D model;
    obtaining data informative of a second 3D model associated with an interior cavity of the shoe, the second 3D model having a second point cloud comprising a plurality of data points representing the surface of the second 3D model;
    aligning the first and second point clouds such that the heel extreme point of the second point cloud aligns with the heel extreme point of the first point cloud and the ankle back extreme point of the first point cloud aligns with the top back point of the second point cloud;
    calculating for at least one point p in the first point cloud a value of at least one fit indicator indicative of a fit between the foot and the shoe at the point p, the value of fit indicator determined based on a distance between the at least one point p and a corresponding point q in the aligned second point cloud; and
    outputting, to a display device, a graphical representation of the first 3D model colored in accordance with the calculated at least one fit indicator, wherein the color at p is indicative of the fit calculated at p,
    wherein aligning the first and second point clouds comprises calculating a Principal Component Analysis (PCA) of each point cloud, aligning the centers and the axes of each point cloud, detecting the plane of each point cloud, calculating the residual rigid transformation to make the two planes coincide, and refining the results of the transformation to make the heel extreme point of the second point cloud align with the heel extreme point of the first point cloud and the ankle back extreme point of the first point cloud align with the top back point of the second point cloud.

2. The method of claim 1, wherein the second 3D model is associated with a shoe last of the shoe representative of the interior cavity of the shoe.

3. The method of claim 1, wherein aligning the centers and the axes of each point cloud comprises finding the optimal rigid transformation that merges the local coordinate systems of each point cloud.

4. The method of claim 1, wherein detecting the plane of the second point cloud comprises detecting points of low curvature and applying a statistical technique to the detected points to identify the points that form the most planar pattern.

5. The method of claim 1, wherein the refining further comprises detecting the heel extreme point as the point of local maximal curvature in the region of the heel bottom, and detecting the ankle back extreme point as lying beneath the malleoli.

6. The method of claim 1, wherein the at least one fit indicator is calculated at each of a plurality of different regions of the first point cloud, each region comprising at least two points, wherein each region is colored according to the at least one fit indicator calculated for the given region.

7. The method of claim 1, further comprising, by the processor, providing a recommendation in accordance with the at least one fit indicator, said recommendation being indicative of at least one of the following:
    a measure of the fit of the shoe;
    a different shoe to try;
    a different size to try.

8. A method of virtual fitting of a foot with a shoe, the method comprising, by a processor:
    obtaining data informative of a first 3D model associated with the foot, the first 3D model having a first point cloud comprising a plurality of data points representing the surface of the first 3D model;
    obtaining data informative of a second 3D model associated with an interior cavity of the shoe, the second 3D model having a second point cloud comprising a plurality of data points representing the surface of the second 3D model;
    aligning the first and second point clouds such that the heel extreme point of the second point cloud aligns with the heel extreme point of the first point cloud and the ankle back extreme point of the first point cloud aligns with the top back point of the second point cloud;
    calculating for at least one point p in the first point cloud a value of at least one fit indicator indicative of a fit between the foot and the shoe at the point p, the value of fit indicator determined based on a distance between the at least one point p and a corresponding point q in the aligned second point cloud; and outputting, to a display device, a graphical representation of the first 3D model colored in accordance with the calculated at least one fit indicator, wherein the color at p is indicative of the fit calculated at p, wherein aligning the first and second point clouds further comprises at least one of:

applying an articulated motion to the toe region of the first point cloud at an articulation axis detected as the front point where the interior arc of the foot is tangent to the ground;

simulating an articulated motion of the ankle with respect to the foot.

9. A method of virtual fitting of a foot with a shoe, the method comprising, by a processor:

obtaining data informative of a first 3D model associated with the foot, the first 3D model having a first point cloud comprising a plurality of data points representing the surface of the first 3D model;

obtaining data informative of a second 3D model associated with an interior cavity of the shoe, the second 3D model having a second point cloud comprising a plurality of data points representing the surface of the second 3D model;

aligning the first and second point clouds such that the heel extreme point of the second point cloud aligns with the heel extreme point of the first point cloud and the ankle back extreme point of the first point cloud aligns with the top back point of the second point cloud;

calculating for at least one point p in the first point cloud a value of at least one fit indicator indicative of a fit between the foot and the shoe at the point p, the value of fit indicator determined based on a distance between the at least one point p and a corresponding point q in the aligned second point cloud; and outputting, to a display device, a graphical representation of the first 3D model colored in accordance with the calculated at least one fit indicator, wherein the color at p is indicative of the fit calculated at p, wherein calculating the value for the at least one fit indicator comprises calculating the normal $n_p$ of the first point cloud surface at p, considering the line $l_p$ passing through p and parallel to the normal $n_p$, calculating the intersection point q between the line $l_p$ and the second point cloud, and calculating the distance between p and q, the distance being indicative of a fit indicator.

10. A system for virtual fitting of a foot with a shoe, comprising:

a memory configured to store data informative of first 3D model associated with the foot, the first 3D model having a first point cloud comprising a plurality of data points representing the surface of the first 3D model, and to store data informative of a second 3D model associated with an interior cavity of the shoe, the second 3D model having a second point cloud comprising a plurality of data points representing the surface of the second 3D model; and a processor operatively coupled to the memory and configured to process the first and second point clouds by:

aligning the first and second point clouds such that the heel extreme point of the second point cloud aligns with the heel extreme point of the first point cloud and the ankle back extreme point of the first point cloud aligns with the top back point of the second point cloud;

calculating for at least one point p in the first point cloud a value of at least one fit indicator indicative of a fit between the foot and the shoe at the point p, the value of the at least one fit indicator determined based on a distance between the at least one point p and a corresponding point q in the aligned second point cloud; and outputting, to a display device, a graphical representation of the first 3D model colored in accordance with the calculated at least one fit indicator, wherein the color at p is indicative of the fit calculated at p, wherein aligning the first and second point clouds comprises calculating a Principal Component Analysis (PCA) of each point cloud, aligning the centers and the axes of each point cloud, detecting the plane of each point cloud, calculating the residual rigid transformation to make the two planes coincide, and refining the results of the transformation to make the heel extreme point of the second point cloud align with the heel extreme point of the first point cloud and the ankle back extreme point of the first point cloud align with the top back point of the second point cloud.

11. The system of claim 10, wherein the second 3D model is associated with a shoe last of the shoe, the shoe last representative of the interior cavity of the shoe.

12. The system of claim 10, wherein aligning the centers and the axes of each point cloud comprises finding the optimal rigid transformation that merges the local coordinate systems of each point cloud.

13. The system of claim 10, wherein detecting the plane of the second point cloud comprises detecting points of low curvature and applying a statistical technique to the detected points to identify the points that form the most planar pattern.

14. The system of claim 10, wherein the refining further comprises detecting the heel extreme point as the point of local maximal curvature in the region of the heel bottom, and detecting the ankle back extreme point as lying beneath the malleoli.

15. The system of claim 10, wherein aligning the first and second point clouds further comprises at least one of:

applying an articulated motion to the toe region of the first point cloud at an articulation axis detected as the front point where the interior arc of the foot is tangent to the ground;

simulating an articulated motion of the ankle with respect to the foot.

16. The system of claim 10, wherein calculating the value for the at least one fit indicator comprises calculating the normal $n_p$ of the first point cloud surface at p, considering the line $l_p$ passing through p and parallel to the normal $n_p$, calculating the intersection point q between the line $l_p$ and the second point cloud, and calculating the distance between p and q, the distance being indicative of the at least one fit indicator.

17. The system of claim 10, wherein the at least one fit indicator is calculated at each of a plurality of different regions of the first point cloud, each region comprising at least two points, wherein each region is colored according to the at least one fit indicator calculated for the given region.

18. A non-transitory storage medium comprising instructions executable by a computer for executing a method of virtual fitting of a foot with a shoe, the method comprising:

obtaining data informative of a first 3D model associated with the foot, the first 3D model having a first point cloud comprising a plurality of data points representing the surface of the first 3D model;

obtaining data informative of a second 3D model associated with an interior cavity of the shoe, the second 3D model having a second point cloud comprising a plurality of data points representing the surface of the second 3D model;

aligning the first and second point clouds such that the heel extreme point of the second point cloud aligns with the heel extreme point of the first point cloud and the ankle back extreme point of the first point cloud aligns with the top back point of the second point cloud;

calculating for at least one point p in the first point cloud a value of at least one fit indicator indicative of a fit between the foot and the shoe at the point p, the value of the at least one fit indicator determined based on a distance between the at least one point p and a corresponding point q in the aligned second point cloud; and outputting, to a display device, a graphical representation of the first 3D model colored in accordance with the calculated at least one fit indicator, wherein the color at p is indicative of the fit calculated at p, wherein aligning the first and second point clouds comprises calculating a Principal Component Analysis (PCA) of each point cloud, aligning the centers and the axes of each point cloud, detecting the plane of each point cloud, calculating the residual rigid transformation to make the two planes coincide, and refining the results of the transformation to make the heel extreme point of the second point cloud align with the heel extreme point of the first point cloud and the ankle back extreme point of the first point cloud align with the top back point of the second point cloud.

* * * * *